US006865508B2

(12) United States Patent
Ueki et al.

(10) Patent No.: US 6,865,508 B2
(45) Date of Patent: Mar. 8, 2005

(54) LOG ANALYSIS METHOD AND RECORDING MEDIUM STORING LOG ANALYSIS PROGRAM

(75) Inventors: Katsuhiko Ueki, Tokyo (JP); Humitaka Tamura, Kanagawa (JP); Wataru Okamoto, Kanagawa (JP); Masayuki Hirayama, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 69 days.

(21) Appl. No.: 10/329,397

(22) Filed: Dec. 27, 2002

(65) Prior Publication Data
US 2003/0125904 A1 Jul. 3, 2003

(30) Foreign Application Priority Data

Dec. 28, 2001 (JP) ........................................ 2001-401926

(51) Int. Cl.⁷ ............................ G06F 17/18; G06F 19/00
(52) U.S. Cl. ......................... 702/181; 703/22; 709/224
(58) Field of Search ............................ 702/127, 179, 702/181, 182, 186; 703/22; 370/241, 252; 700/91; 706/52; 709/224

(56) References Cited

U.S. PATENT DOCUMENTS

| | | | | |
|---|---|---|---|---|
| 6,564,170 B2 * | 5/2003 | Halabieh | ............... | 702/181 |
| 2002/0069044 A1 * | 6/2002 | Berg et al. | ............... | 703/22 |

FOREIGN PATENT DOCUMENTS

| | | |
|---|---|---|
| JP | 10-320234 | 12/1998 |
| JP | 2002-259168 * | 9/2002 |

OTHER PUBLICATIONS

Translation of JP 2002–259168.*
William Dickinson, et al., "Finding Failures by Cluster Analysis of Execution Profiles", Proceedings of the 23rd International Conference on Software Engineering, ICSE, 2001, pp. 339–348.
K. Ueki, et al., The Institute of Electronics, Information and Communication Engineers, vol. 100, No. 186, pp. 1–8, "A Probe Debugging Method", Jul. 2000 (with English Abstract).

* cited by examiner

Primary Examiner—John Barlow
Assistant Examiner—John Le
(74) Attorney, Agent, or Firm—Oblon, Spivak, McClelland, Maier & Neustadt, P.C.

(57) ABSTRACT

One of log analysis methods of the present invention includes the step of executing a program a plurality of times; executing a program a plurality of times; the step of generating a plurality of logs, each log being recorded a plurality of events occurring upon the execution of the program according to an occurrence order of each of the events in each of the logs; the step of performing a first calculation to calculate an event occurrence probability, for the occurrence order of each event, based on at least one from the program description concerning each event recorded in the logs and the data to be used upon the execution of the program description; and the step of outputting information concerning an event which corresponds to a characteristic included in the logs, based on the event occurrence probability.

16 Claims, 23 Drawing Sheets

FIG. 6

```
int  f (int  num);
int  k(int  num);
int  g(int  id);
int  h(int  cost);
int  price [] = { 100, 50, 20, 10 } ;
int  fee[] = { 80, 20, -20 } ;
int  main () {
    int i :
    for (i=0; i <20;i =i+4) {
        if (f( i ) ! =k(i)) {
            printf(" error\n" );
        }
    }
    return 0;
} int  f (int  num); {
    int  i ;
    int  cost ;
    int  tax = 0 ;

for ( i=num; i<num+4; i ++) {
        cost  =  g(i) ;
        tax  = tax  +   h (cost ) ;
    }
    return tax ;
} int  k(int  num); {
    int  i ;
    int  cost ;
    int  sum = 0 ;
    int  tax = 0 ;

for ( i=num; i<num+4; i ++) {
        cost  =  g(i) ;
        if (cost > 0) {
            sum = sum  +  cost ;
        }
        tax  = h (sum );
    }
    return tax ;
} int  g(int  id); {
    cost ;
    cost  =  price [id%4 ] + fee[ id%3 ] ;
    return cost ;
} int  h(int  cost); {
    int tax ;
    tax = cost /10 ;
    return tax ;
}
```

FIG. 7

OCCURRENCE ORDER →

| LOG | | | | | | | | | | i | |
|---|---|---|---|---|---|---|---|---|---|---|---|
| LOG 1: | f(0) g(0) h(180) g(1) h(70) g(2) h(0) g(3) h(90)<br>k(0) g(0) h(180) g(1) h(250) g(2) h(250) g(3) h(340) | | | | | | | | | i=0 | FIRST EXECUTION |
| LOG 2: | f(4) g(4) h(120) g(5) h(30) g(6) h(100) g(7) h(30)<br>k(4) g(4) h(120) g(5) h(150) g(6) h(250) g(7) h(280) | | | | | | | | | i=4 | SECOND EXECUTION |
| LOG 3: | f(8) g(8) h(80) g(9) h(130) g(10) h(40) g(11) h(-10)<br>k(8) g(8) h(80) g(9) h(210) g(10) h(250) g(11) h(250) | | | | | | | | | i=8 | THIRD EXECUTION |
| LOG 4: | f(12) g(12) h(180) g(13) h(70) g(14) h(0) g(15) h(90)<br>k(12) g(12) h(180) g(13) h(250) g(14) h(250) g(15) h(340) | | | | | | | | | i=12 | FOURTH EXECUTION |
| LOG 5: | f(16) g(16) h(120) g(17) h(30) g(18) h(100) g(19) h(30)<br>k(16) g(16) h(120) g(17) h(150) g(18) h(250) g(19) h(280) | | | | | | | | | i=16 | FIFTH EXECUTION |

FIG. 8

| CONVERTED LOG \ OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| CONVERTED LOG 1: | f | g | h | g | h | g | h | g | h | k | g | h | g | h | g | h | g | h |
| CONVERTED LOG 2: | f | g | h | g | h | g | h | g | h | k | g | h | g | h | g | h | g | h |
| CONVERTED LOG 3: | f | g | h | g | h | g | h | g | h | k | g | h | g | h | g | h | g | h |
| CONVERTED LOG 4: | f | g | h | g | h | g | h | g | h | k | g | h | g | h | g | h | g | h |
| CONVERTED LOG 5: | f | g | h | g | h | g | h | g | h | k | g | h | g | h | g | h | g | h |

FIG. 9

| CONVERTED LOG \ OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| CONVERTED LOG 1: | f | g | h | g | h | g | h | g | h | k | g | h | g | h | g | h | g | h |
| CONVERTED LOG 2: | f | g | h | g | h | g | h | g | h | k | g | h | g | h | g | h | g | h |
| CONVERTED LOG 3: | f | g | h | g | h | g | h | g | h | k | g | h | g | h | g | h | g | h |
| CONVERTED LOG 4: | f | g | h | g | h | g | h | g | h | k | g | h | g | h | g | h | g | h |
| CONVERTED LOG 5x: | f | g | h | g | h | g | h | g | h | - | g | h | g | h | g | h | g | h |

FIG. 10

| OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| EVENT | f | g | h | g | h | g | h | g | h | k | g | h | g | h | g | h | g | h |
| OCCURRENCE PROBABILITY | 1 | 1 | 1 | 1 | 1 | 1 | 1 | 1 | 1 | 1 | 1 | 1 | 1 | 1 | 1 | 1 | 1 | 1 |

FIG. 11

| OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| EVENT | f | g | h | g | h | g | h | g | h | k | g | h | g | h | g | h | g | h |
| OCCURRENCE PROBABILITY | 1 | 1 | 1 | 1 | 1 | 1 | 1 | 1 | 1 | 0.8 | 1 | 1 | 1 | 1 | 1 | 1 | 1 | 1 |

FIG. 12

| OCCURRENCE ORDER / CONVERTED LOG | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| CONVERTED LOG 1 | 0 | 0 | 0 | 0 | 0 | 0 | 0 | 0 | 0 | 0 | 0 | 0 | 0 | 0 | 0 | 0 | 0 | 0 |
| CONVERTED LOG 2 | 0 | 0 | 0 | 0 | 0 | 0 | 0 | 0 | 0 | 0 | 0 | 0 | 0 | 0 | 0 | 0 | 0 | 0 |
| CONVERTED LOG 3 | 0 | 0 | 0 | 0 | 0 | 0 | 0 | 0 | 0 | 0 | 0 | 0 | 0 | 0 | 0 | 0 | 0 | 0 |
| CONVERTED LOG 4 | 0 | 0 | 0 | 0 | 0 | 0 | 0 | 0 | 0 | 0 | 0 | 0 | 0 | 0 | 0 | 0 | 0 | 0 |
| CONVERTED LOG 5 | 0 | 0 | 0 | 0 | 0 | 0 | 0 | 0 | 0 | 0 | 0 | 0 | 0 | 0 | 0 | 0 | 0 | 0 |

FIG. 13

| CONVERTED LOG \ OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| CONVERTED LOG 1 | 0 | 0 | 0 | 0 | 0 | 0 | 0 | 0 | 0 | 0.1 | 0 | 0 | 0 | 0 | 0 | 0 | 0 | 0 |
| CONVERTED LOG 2 | 0 | 0 | 0 | 0 | 0 | 0 | 0 | 0 | 0 | 0.1 | 0 | 0 | 0 | 0 | 0 | 0 | 0 | 0 |
| CONVERTED LOG 3 | 0 | 0 | 0 | 0 | 0 | 0 | 0 | 0 | 0 | 0.1 | 0 | 0 | 0 | 0 | 0 | 0 | 0 | 0 |
| CONVERTED LOG 4 | 0 | 0 | 0 | 0 | 0 | 0 | 0 | 0 | 0 | 0.1 | 0 | 0 | 0 | 0 | 0 | 0 | 0 | 0 |
| CONVERTED LOG 5x | 0 | 0 | 0 | 0 | 0 | 0 | 0 | 0 | 0 | 0.7 | 0 | 0 | 0 | 0 | 0 | 0 | 0 | 0 |

FIG. 14

| LOG \ OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| LOG 1 | f+ | g+ | h+ | g+ | h+ | g+ | h+ | g+ | h+ | k+ | g+ | h+ | g+ | h+ | g+ | h+ | g+ | h+ |
| LOG 2 | f+ | g+ | h+ | g+ | h+ | g+ | h+ | g+ | h+ | k+ | g+ | h+ | g+ | h+ | g+ | h+ | g+ | h+ |
| LOG 3 | f+ | g+ | h+ | g+ | h+ | g+ | h+ | g+ | h- | k+ | g+ | h+ | g+ | h+ | g+ | h+ | g+ | h+ |
| LOG 4 | f+ | g+ | h+ | g+ | h+ | g+ | h+ | g+ | h+ | k+ | g+ | h+ | g+ | h+ | g+ | h+ | g+ | h+ |
| LOG 5 | f+ | g+ | h+ | g+ | h+ | g+ | h+ | g+ | h+ | k+ | g+ | h+ | g+ | h+ | g+ | h+ | g+ | h+ |

FIG. 15

| OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| EVENT | f+ | g+ | h+ | g+ | h+ | g+ | h+ | g+ | h+ | k+ | g+ | h+ | g+ | h+ | g+ | h+ | g+ | h+ |
| OCCURRENCE PROBABILITY | 1 | 1 | 1 | 1 | 1 | 1 | 1 | 1 | 0.8 | 1 | 1 | 1 | 1 | 1 | 1 | 1 | 1 | 1 |

FIG. 16

| LOG \ OCCURRENCE ORDER | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| LOG 1 | 0 | 0 | 0 | 0 | 0 | 0 | 0 | 0 | 0.1 | 0 | 0 | 0 | 0 | 0 | 0 | 0 | 0 | 0 |
| LOG 2 | 0 | 0 | 0 | 0 | 0 | 0 | 0 | 0 | 0.1 | 0 | 0 | 0 | 0 | 0 | 0 | 0 | 0 | 0 |
| LOG 3 | 0 | 0 | 0 | 0 | 0 | 0 | 0 | 0 | 0.7 | 0 | 0 | 0 | 0 | 0 | 0 | 0 | 0 | 0 |
| LOG 4 | 0 | 0 | 0 | 0 | 0 | 0 | 0 | 0 | 0.1 | 0 | 0 | 0 | 0 | 0 | 0 | 0 | 0 | 0 |
| LOG 5 | 0 | 0 | 0 | 0 | 0 | 0 | 0 | 0 | 0.1 | 0 | 0 | 0 | 0 | 0 | 0 | 0 | 0 | 0 |

FIG. 17

| LOG \ OCCURRENCE ORDER | 1 | 2 | 3 | 4 | 5 | 6 | 7 | 8 | 9 | 10 | 11 | 12 | 13 | 14 | 15 | 16 | 17 | 18 | CHARACTERISTIC VALUE |
|---|---|---|---|---|---|---|---|---|---|---|---|---|---|---|---|---|---|---|---|
| LOG 1 | 1 | 1 | 1 | 1 | 1 | 1 | 1 | 1 | 0.8 | 1 | 1 | 1 | 1 | 1 | 1 | 1 | 1 | 1 | →0.8 |
| LOG 2 | 1 | 1 | 1 | 1 | 1 | 1 | 1 | 1 | 0.8 | 1 | 1 | 1 | 1 | 1 | 1 | 1 | 1 | 1 | →0.8 |
| LOG 3 | 1 | 1 | 1 | 1 | 1 | 1 | 1 | 1 | 0.2 | 1 | 1 | 1 | 1 | 1 | 1 | 1 | 1 | 1 | →0.2 |
| LOG 4 | 1 | 1 | 1 | 1 | 1 | 1 | 1 | 1 | 0.8 | 1 | 1 | 1 | 1 | 1 | 1 | 1 | 1 | 1 | →0.8 |
| LOG 5 | 1 | 1 | 1 | 1 | 1 | 1 | 1 | 1 | 0.8 | 1 | 1 | 1 | 1 | 1 | 1 | 1 | 1 | 1 | →0.8 |

FIG. 18

| LOG \ OCCURRENCE ORDER | 1 | 2 | 3 | 4 | 5 | 6 | 7 | 8 | 9 | 10 | 11 | 12 | 13 | 14 | 15 | 16 | 17 | 18 | CHARACTERISTIC VALUE |
|---|---|---|---|---|---|---|---|---|---|---|---|---|---|---|---|---|---|---|---|
| LOG 1 | 0 | 0 | 0 | 0 | 0 | 0 | 0 | 0 | 0.1 | 0 | 0 | 0 | 0 | 0 | 0 | 0 | 0 | 0 | →0.1 |
| LOG 2 | 0 | 0 | 0 | 0 | 0 | 0 | 0 | 0 | 0.1 | 0 | 0 | 0 | 0 | 0 | 0 | 0 | 0 | 0 | →0.1 |
| LOG 3 | 0 | 0 | 0 | 0 | 0 | 0 | 0 | 0 | 0.7 | 0 | 0 | 0 | 0 | 0 | 0 | 0 | 0 | 0 | →0.7 |
| LOG 4 | 0 | 0 | 0 | 0 | 0 | 0 | 0 | 0 | 0.1 | 0 | 0 | 0 | 0 | 0 | 0 | 0 | 0 | 0 | →0.1 |
| LOG 5 | 0 | 0 | 0 | 0 | 0 | 0 | 0 | 0 | 0.1 | 0 | 0 | 0 | 0 | 0 | 0 | 0 | 0 | 0 | →0.1 |

FIG. 21

```
int vals [13] ;
int main ()
{
    int i ;
    for (i=1; i<=12 ; i++) {
        init (i) ;
    }
    for (i=1 ; i<=12; i++) {
        if (i%4==0) {
            clean(i) ;
        }
    }
    for (i=1 ; i<=12 ; i++) {
        if (i%3==0) {
            calc(i) ;
        }
    }
    return 0;
} void init (int i)
    { vals[i] = 0; } void clean (int i)
    { vals[i] = -1; } void calc (int i)
    { vals[i] += 1; }
```

FIG. 22

```
init  : vals [1]
init  : vals [2]
init  : vals [3]
init  : vals [4]
init  : vals [5]
init  : vals [6]     OCCURRENCE ORDER
init  : vals [7]
init  : vals [8]
init  : vals [9]
init  : vals [10]
init  : vals [11]
init  : vals [12]
clean : vals [4]
clean : vals [8]
clean : vals [12]
calc  : vals [3]
calc  : vals [6]
calc  : vals [9]
calc  : vals [12]
```

FIG. 23

| CLASSIFIED LOG \ OCCURRENCE ORDER | 1 | 2 | 3 |
|---|---|---|---|
| CLASSIFIED LOG 1 | init : vals[1] | | |
| CLASSIFIED LOG 2 | init : vals[2] | | |
| CLASSIFIED LOG 3 | init : vals[3] | calc : vals[3] | |
| CLASSIFIED LOG 4 | init : vals[4] | clean : vals[4] | |
| CLASSIFIED LOG 5 | init : vals[5] | | |
| CLASSIFIED LOG 6 | init : vals[6] | calc : vals[6] | |
| CLASSIFIED LOG 7 | init : vals[7] | | |
| CLASSIFIED LOG 8 | init : vals[8] | clean : vals[8] | |
| CLASSIFIED LOG 9 | init : vals[9] | calc : vals[9] | |
| CLASSIFIED LOG 10 | init : vals[10] | | |
| CLASSIFIED LOG 11 | init : vals[11] | | |
| CLASSIFIED LOG 12 | init : vals[12] | clean : vals[12] | calc : vals[12] |

FIG. 24

| CONVERTED LOG \ OCCURRENCE ORDER | 1 | 2 | 3 |
|---|---|---|---|
| CONVERTED LOG 1 | init : vals[1] | - | - |
| CONVERTED LOG 2 | init : vals[2] | - | - |
| CONVERTED LOG 3 | init : vals[3] | - | calc : vals[3] |
| CONVERTED LOG 4 | init : vals[4] | clean : vals[4] | - |
| CONVERTED LOG 5 | init : vals[5] | - | - |
| CONVERTED LOG 6 | init : vals[6] | - | calc : vals[6] |
| CONVERTED LOG 7 | init : vals[7] | - | - |
| CONVERTED LOG 8 | init : vals[8] | clean : vals[8] | - |
| CONVERTED LOG 9 | init : vals[9] | - | calc : vals[9] |
| CONVERTED LOG 10 | init : vals[10] | - | - |
| CONVERTED LOG 11 | init : vals[11] | - | - |
| CONVERTED LOG 12 | init : vals[12] | clean : vals[12] | calc : vals[12] |

FIG. 25

| OCCURRENCE ORDER | 1 | 1 | 1 |
|---|---|---|---|
| EVENT | init : vals | clean : vals | calc : vals |
| OCCURRENCE PROBABILITY | 1 | 0.25 | 0.33 |

FIG. 26

| CONVERTED LOG \ OCCURRENCE ORDER | 1 | 2 | 3 |
|---|---|---|---|
| CONVERTED LOG 1 | 0 | 0.12 | 0.17 |
| CONVERTED LOG 2 | 0 | 0.12 | 0.17 |
| CONVERTED LOG 3 | 0 | 0.12 | 0.48 |
| CONVERTED LOG 4 | 0 | 0.60 | 0.17 |
| CONVERTED LOG 5 | 0 | 0.12 | 0.17 |
| CONVERTED LOG 6 | 0 | 0.12 | 0.48 |
| CONVERTED LOG 7 | 0 | 0.12 | 0.17 |
| CONVERTED LOG 8 | 0 | 0.60 | 0.17 |
| CONVERTED LOG 9 | 0 | 0.12 | 0.48 |
| CONVERTED LOG 10 | 0 | 0.12 | 0.17 |
| CONVERTED LOG 11 | 0 | 0.12 | 0.17 |
| CONVERTED LOG 12 | 0 | 0.60 | 0.48 |

FIG. 27

| CONVERTED LOG | CHARACTERISTIC RATE |
|---|---|
| CONVERTED LOG 1 | 0.29 |
| CONVERTED LOG 2 | 0.29 |
| CONVERTED LOG 3 | 0.60 |
| CONVERTED LOG 4 | 0.77 |
| CONVERTED LOG 5 | 0.29 |
| CONVERTED LOG 6 | 0.60 |
| CONVERTED LOG 7 | 0.29 |
| CONVERTED LOG 8 | 0.77 |
| CONVERTED LOG 9 | 0.60 |
| CONVERTED LOG 10 | 0.29 |
| CONVERTED LOG 11 | 0.29 |
| CONVERTED LOG 12 | 1.08 |

FIG. 28

| CONVERTED LOG \ OCCURRENCE ORDER | 1 | 2 | 3 |
|---|---|---|---|
| CONVERTED LOG 1 | 1 | 0.75 | 0.67 |
| CONVERTED LOG 2 | 1 | 0.75 | 0.67 |
| CONVERTED LOG 3 | 1 | 0.75 | 0.33 |
| CONVERTED LOG 4 | 1 | 0.25 | 0.66 |
| CONVERTED LOG 5 | 1 | 0.75 | 0.67 |
| CONVERTED LOG 6 | 1 | 0.75 | 0.33 |
| CONVERTED LOG 7 | 1 | 0.75 | 0.67 |
| CONVERTED LOG 8 | 1 | 0.25 | 0.66 |
| CONVERTED LOG 9 | 1 | 0.75 | 0.33 |
| CONVERTED LOG 10 | 1 | 0.75 | 0.67 |
| CONVERTED LOG 11 | 1 | 0.75 | 0.67 |
| CONVERTED LOG 12 | 1 | 0.25 | 0.33 |

FIG. 29

```
class A
  {
  public :
     int height ;
     int width ;
  } ;

void f ();
void g(A &a ) ;

int main ()
  {
     A a1;
     a1 .height = 10;
     a1.width = 20;
     g(a1);

f ();

A a3 ;
     a3. height = 30;
     int area;
     area = a3. height * a3. width;
  } void f ();
  {
     A a2 ;
     a2. height = 20;
     a2. width = 20;
     g(a2);
  } void g(A &a )
  {
     int area;
     area = a. height * a. width;
  }
```

FIG. 30

OCCURRENCE ORDER →

| | | | | | | | | | | | | | | |
|---|---|---|---|---|---|---|---|---|---|---|---|---|---|---|
| main() | | | | | | | | | | | | | | |
| A a1; | a1:0x10010 | | | | | | | | | | | | | |
| a1.height = 10; | | a1:0x10010, a1.height:0x10010=10 | | | | | | | | | | | | |
| a1.width = 20; | | | a1:0x10010, a1.width:0x10014=20 | | | | | | | | | | | |
| g(a1); | | | | a1:0x10010 | | | | | | | | | | |
| area=a.height * a.width; | | | | | a:0x10010, a1.height:0x10010, a1.width:0x10014, area:0x10100 = 200 | | | | | | | | | |
| f(); | | | | | | | | | | | | | | |
| A a2; | | | | | | a2:0x10020 | | | | | | | | |
| a2.height = 20; | | | | | | | a2:0x10020, a2.height:0x10020 = 20 | | | | | | | |
| a2.width = 20; | | | | | | | | a2:0x10020, a2.width:0x10024=20 | | | | | | |
| g(a2); | | | | | | | | | a2:0x10020 | | | | | |
| area=a.height * a.width; | | | | | | | | | | a:0x10020, a2.height:0x10020, a2.width:0x10024, area:0x10110 = 400 | | | | |
| A a3; | | | | | | | | | | | a3:0x10030 | | | |
| a3.height = 30; | | | | | | | | | | | | a3:0x10030, a3.height:0x10030 | | |
| area=a3.height * a3.width; | | | | | | | | | | | | | a3:0x10030, a3.height:0x10030, a3.width:0x10034, area:0x10120 = 0 | |

FIG. 31

| CLASSIFIED LOG 1: | |
|---|---|
| A a1 ; | a1 : 0x10010 |
| a1. height = 10 ; | a1 : 0x10010, a1. height : 0x10010 = 10 |
| a1. width = 20 ; | a1 : 0x10010, a1. width : 0x10014 = 20 |
| g(a1) ; | a1 : 0x10010 |
| area = a. height * a. width ; | a : 0x10010, a1. height : 0x10010, a1. width : 0x10014, area : 0x10100 = 200 |
| CLASSIFIED LOG 2: | |
| A a2 ; | a2 : 0x10020 |
| a2. height = 20 ; | a2 : 0x10020, a2. height : 0x10020 = 20 |
| a2. width = 20 ; | a2 : 0x10020, a2. width : 0x10024 = 20 |
| g(a2) ; | a2 : 0x10020 |
| area = a. height * a. width ; | a : 0x10020, a2. height : 0x10020, a2. width : 0x10024, area : 0x10110 = 400 |

FIG. 32

| CLASSIFIED LOG 1: |
|---|
| A a1 ; <br> a1. height = 10 ; <br> a1. width = 20 ; <br> g(a1) ; <br> area = a. height * a. width ; |
| CLASSIFIED LOG 2: |
| A a2 ; <br> a2. height = 20 ; <br> a2. width = 20 ; <br> g(a2) ; <br> area = a. height * a. width ; |

FIG. 33

| | |
|---|---|
| CLASSIFIED LOG 1: | |
| A a1 ; | a1 : 0x10010 |
| a1.height = 10 ; | a1 : 0x10010, a1.height : 0x10010 =10 |
| a1.width = 20 ; | a1 : 0x10010, a1.width : 0x10014 =20 |
| g(a1) ; | a1 : 0x10010 |
| area = a.height * a.width ; | a : 0x10010, a1.height : 0x10010, a1.width : 0x10014, area : 0x10100 = 200 |
| CLASSIFIED LOG 2: | |
| A a2 ; | a2 : 0x10020 |
| a2.height = 20 ; | a2 : 0x10020, a2.height : 0x10020 =20 |
| a2.width = 20 ; | a2 : 0x10020, a2.width : 0x10024 =20 |
| g(a2) ; | a2 : 0x10020 |
| area = a.height * a.width ; | a : 0x10020, a2.height : 0x10020, a2.width : 0x10024, area : 0x10110 = 400 |
| CLASSIFIED LOG 3: | |
| A a3 ; | a3 : 0x10030 |
| a3.height = 30 ; | a3 : 0x10030, a3.height : 0x10030 |
| area = a3.height * a3.width ; | a3 : 0x10030, a3.height : 0x10030, a3.width : 0x10034, area : 0x10120 = 0 |

FIG. 34

CLASSIFIED LOG 1:

A a1 ;
a1. height = 10 ;
a1. width = 20 ;
g(a1) ;
area = a. height * a. width ;

CLASSIFIED LOG 2:

A a2 ;
a2. height = 20 ;
a2. width = 20 ;
g(a2) ;
area = a. height * a. width ;

CLASSIFIED LOG 3:

A a3 ;
a3. height = 30 ;
area = a3. height * a3. width ;

LOG ANALYSIS METHOD AND RECORDING MEDIUM STORING LOG ANALYSIS PROGRAM

CROSS REFERENCE TO RELATED APPLICATIONS

This application is based upon and claims the benefit of priority from the prior Japanese Patent Application No. p2001-401926, filed on Dec. 28, 2001; the entire contents of which are incorporated herein by reference.

BACKGROUND OF THE INVENTION

1. Field of the Invention

The present invention is related to a method of analyzing log obtained by execution of program and a computer readable recording medium storing a log analysis program.

2. Description of the Related Art

In the field of software development in recent years, logs obtained by execution of a subject program are utilized in a debugging operation as to whether or not there are bugs within the subject program. To be more precise, the following debugging method using logs is widely used. Specifically, a predetermined viewer displays at least one log which includes one or a plurality of items of event information. Then, a debugging operator performs a debugging operation based on the display.

For example, one or more logs displayed by the predetermined viewer indicate a history of a series of system calls executed by an operating system (OS), or a history of a series of instances of memory access caused by operation of hardware (or an emulator). Here, an event means a change of state such as system call and memory access. The following two methods are known for the case when the debugging operator performs debugging operation based on one or more logs obtained by execution of the subject program.

(1) A debugging operator carefully investigates one log checked abnormal. Then, the debugging operator seeks a source of a bug based on the investigation.

(2) The debugging operator compares "at least one log obtained by the normal execution of a subject program" and "at least one log obtained by the abnormal execution of a subject program" and seeks a difference between "at least one log obtained by the normal execution of a subject program" and "at least one log obtained by the abnormal execution of a subject program". Then, the debugging operator investigates the difference intensively.

In the case (1), there is no guideline showing as to which part of the log the debugging operator should investigate intensively. Accordingly, the debugging operation becomes complex as the amount of log is increases. As a result, it is difficult for an unskilled debugging operator to perform the debugging operation when the amount of the log is large.

In the case (2), the debugging operator might pay attention to a simple difference between "at least one log obtained by the normal execution of a subject program" and "at least one log obtained by the abnormal execution of a subject program". Since there are so many points to be paid attention in such a case, the debugging operator cannot perform the debugging operation efficiently.

Accordingly, the following method which achieves enhancement of debugging efficiency, (Japanese Patent Application No. 2001-060699; Wataru Okamoto, Katsuhiko Ueki et al., "Proposal for a probe debugging method", Technical Report of the Institute of Electronics, Information and Communication Engineers, Vol. 100, No. 186, pp 1–8 (2000–7); Wataru Okamoto et al., "Realization of a probe debugging method (1) Outlines and Evaluations", The 62nd National Conference of Information Processing Society of Japan, 2Z-2 (2001–03); and Fumitaka Tamura et al., "Realization of a probe debugging method (2) Algorithms"),is proposed.

Specifically, for example, a log characteristic extracting device extracts a characteristic log from among a plurality of logs recording a series of events (a series of events occurring upon execution of a subject program). Then, a debugging operator preferentially investigates program codes concerning the characteristic log. In this proposal, the log characteristic extracting device extracts a log characteristic by calculating occurrence probability of each event. In this case, the log characteristic extracting device extracts the log characteristic by considering each description within the subject program and by considering an execution order of each description within the subject program.

Thereafter, the debugging operator closely investigates information concerning the event corresponding to the log characteristic. As a result, the debugging operator can perform the debugging operation of the subject program efficiently.

Meanwhile, when a given device executes the subject program, various data is read from a memory for the given device to perform a given processing. Moreover, for example, the given device can also record the various data into a built-in register as "log". Furthermore, the given device outputs the log after execution of the subject program.

For this reason, if the log characteristic extracting device can extract a log characteristic further by considering data to be used upon execution of the subject program, then the debugging operation will become convenient in the following point. Specifically, even when the log characteristic extracting device cannot extract the log characteristic only considering "each description within the subject program" and "an execution order of each description within the subject program", there are cases where the log characteristic extracting device is able to extract the log characteristic by considering data to be used upon execution of the subject program.

Upon extracting the log characteristic, what is important is how the log characteristic extracting device considers data to be used upon execution of the subject program. Following is a specific example. For example, code f, code g and code hare functions described within the subject program. A series of events occur as a result of execution of the subject program by the given device. Moreover, the given device records the series of events as "log", according to an occurrence order of each event. Furthermore, for, example, the given device outputs a plurality of logs, in which the series of events are recorded according to the occurrence order, after execution of the subject program. The respective outputted logs are, for example, the following logs 1, 2 and 3:

Log 1: f(−2) g(10) h(14)
Log 2: f(11) g(15) h(18)
Log 3: f(12) g(16) h(19)

Here, each parenthesized numeral, for example, means parameter (data). In the above-described example, when the log characteristic extracting device extracts the log characteristic by considering data (parameter), the following problem exists. Specifically, even if the log characteristic extracting device calculates the occurrence probability of each event by simply comparing the logs with one another, the occurrence probabilities of the respective events become equal or close to one another. For this reason, even if the log characteristic extracting device performs an extraction operation by considering data used upon execution of the subject program, there are cases where it is difficult for the log characteristic extracting device to extract the log characteristic.

On the other hand, when the log characteristic extracting device does not perform the extraction operation by considering data used upon execution of the subject program, the following problem exists. Specifically, as in the above-described example, if the occurrence order of the respective events in each log are identical to each other(f, g, h), it is difficult for the log characteristic extracting device to extract the log characteristic. Therefore, the log characteristic extracting device needs to extract the log characteristic in appropriate consideration of data used upon execution of the subject program.

Meanwhile, the given device accesses to memory area, by executing the function described within the subject program. For this reason, if the log characteristic extracting device can extract log characteristic further by considering access to the memory area, then the debugging operation will become convenient in the following point. Specifically, even when the log characteristic extracting device cannot extract the log characteristic by considering "each description within the subject program" and "an execution order of each description within the subject program", there are cases where the log characteristic extracting device can extract the log characteristic by appropriately considering access to the memory area.

BRIEF SUMMARY OF THE INVENTION

An object of the present invention is to provide a log analysis method capable of providing information useful for program debugging by appropriately considering items other than "each description within a program and an execution order of each description", and to provide a computer readable recording medium storing a log analysis program.

To achieve the object, one of log analysis methods of the present invention comprises the step of executing a program a plurality of times; the step of generating a plurality of logs, each log being recorded a plurality of events occurring upon the execution of the program according to an occurrence order of each of the events in each of the logs; the step of performing a first calculation to calculate an event occurrence probability, for the occurrence order of each event, based on at least one from the program description concerning each event recorded in the logs and the data to be used upon the execution of the program description; and the step of outputting information concerning an event which corresponds to a characteristic included in the logs, based on the event occurrence probability.

BRIEF DESCRIPTION OF THE SEVERAL VIEWS OF THE DRAWINGS

FIG. 6 is a view showing one example of a subject program for describing the log analysis method of Embodiment 1.

FIG. 7 is a view showing one example of a plurality of logs generated by a log generator of Embodiment 1.

FIG. 8 is a view showing one example of a plurality of converted logs converted by a log converter of Embodiment 1.

FIG. 9 is a view showing another example of the plurality of converted logs converted by a log converter of Embodiment 1.

FIG. 10 is a view showing the event occurrence probabilities calculated by an event occurrence probability calculator of Embodiment 1.

FIG. 11 is another view showing the occurrence probabilities calculated by the event occurrence probability calculator of Embodiment 1.

FIG. 12 is a view showing rarities calculated by a rarity calculator of Embodiment 1.

FIG. 13 is another view showing the rarities calculated by the rarity calculator of Embodiment 1.

FIG. 14 is a view showing recorded contents of the respective logs with classification information given by a data value classifier of Embodiment 1.

FIG. 15 is another view showing event occurrence probabilities calculated by the event occurrence probability calculator of Embodiment 1.

FIG. 16 is another view showing the rarities calculated by the rarity calculator of Embodiment 1.

FIG. 17 is a supplementary view describing calculation processing by a characteristic value calculator according to Modified Example 2 of Embodiment 1.

FIG. 18 is another supplementary view describing calculation processing by the characteristic value calculator according to Modified Example 2 of Embodiment 1.

FIG. 21 is a view showing one example of a subject program for describing the log analysis method of Embodiment 2.

FIG. 22 is a view showing recorded contents of logs obtained as a result of executing the subject program of Embodiment 2.

FIG. 23 is a view showing a plurality of classified logs generated by a classified log generator of Embodiment 2.

FIG. 24 is a view showing a plurality of converted logs converted by a log converter of Embodiment 2.

FIG. 25 is a view showing event occurrence probabilities calculated by an event occurrence probability calculator of Embodiment 2.

FIG. 26 is a view showing rarities calculated by a rarity calculator of Embodiment 2.

FIG. 27 is a view showing characteristic values of the respective converted logs calculated by a characteristic value calculator of Embodiment 2.

FIG. 28 is a supplementary view describing calculation processing by the characteristic value calculator of Embodiment 2.

FIG. 29 is a view showing one example of a subject program in order to describe a log analysis method according to Application Example 1 of Embodiment 2.

FIG. 30 is a view showing the recorded contents of logs obtained as a result of executing the subject program of Application Example 1 of Embodiment 2.

FIG. 31 is a view showing a plurality of classified logs generated by a classified log generator according to Application Example 1 of Embodiment 2.

FIG. 32 is another view showing the plurality of classified logs generated by the classified log generator according to Application Example 1 of Embodiment 2.

FIG. 33 is a view showing a plurality of classified logs generated by a classified log generator according to Application Example 2 of Embodiment 2.

FIG. 34 is another view showing the plurality of classified logs generated by the classified log generator according to Application Example 2 of Embodiment 2.

DETAILED DESCRIPTION OF THE INVENTION

Figure 1:
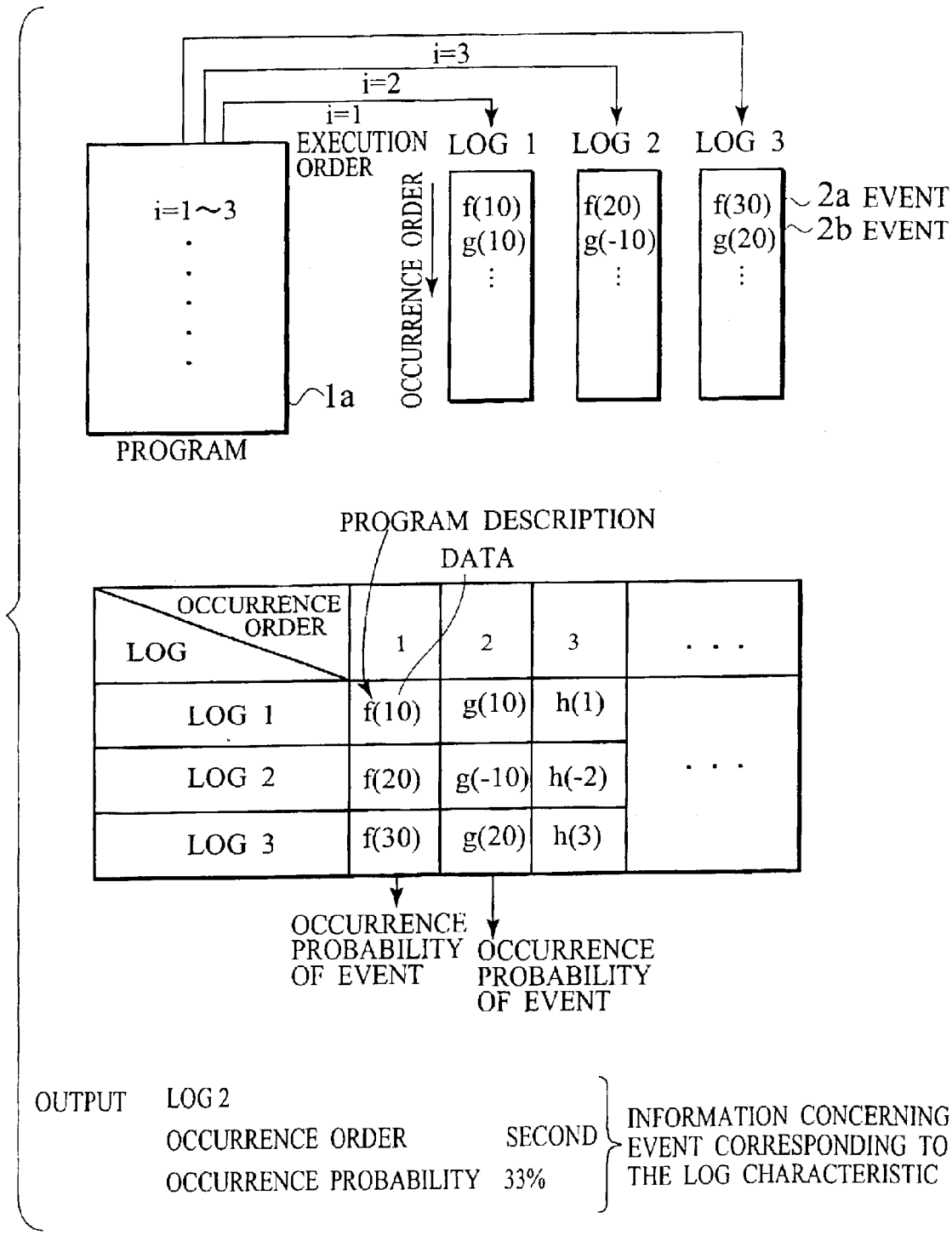
FIG. 1 is a view describing a first concept of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram forms in order not to obscure the present invention in unnecessary detail.

FIG. 1 is a view for describing a first concept of the present invention. The first concept of the present invention will be described below.

A log analysis method of the first concept includes the following steps. The log analysis method includes the step of executing a program (such as a program 1$a$) a plurality of times(such as three times). In the step, events (such as event 2$a$ and event 2$b$) occur upon execution of the program. The log analysis method includes the step of generating a plurality of logs(such as log1, log2, log3),each log being recorded a plurality of events occurring upon the execution of the program according to an occurrence order(such as first, second) of each of the events in each of the logs. Each log is generated for each execution (i=1 to 3) in this step.

The log analysis method includes the step of calculating an event occurrence probability, for the occurrence order of each event, based on at least one from the program description concerning each event recorded in the logs and the data(such as parameter of "f" and parameter of "g", namely, (10) and (20)) to be used upon the execution of the program description.

The log analysis method includes the step of outputting information(such as the log 2, the event of occurrence order (second), event occurrence probability 33%) concerning an event which corresponds to a characteristic included in the logs(log 1~3), based on the event occurrence probability.

Description of embodiment 1 will be carried out based on the above-mentioned concept. Similarly, description of embodiment of a log analysis program 1 will be carried out based on the above-mentioned concept.

Figure 2:
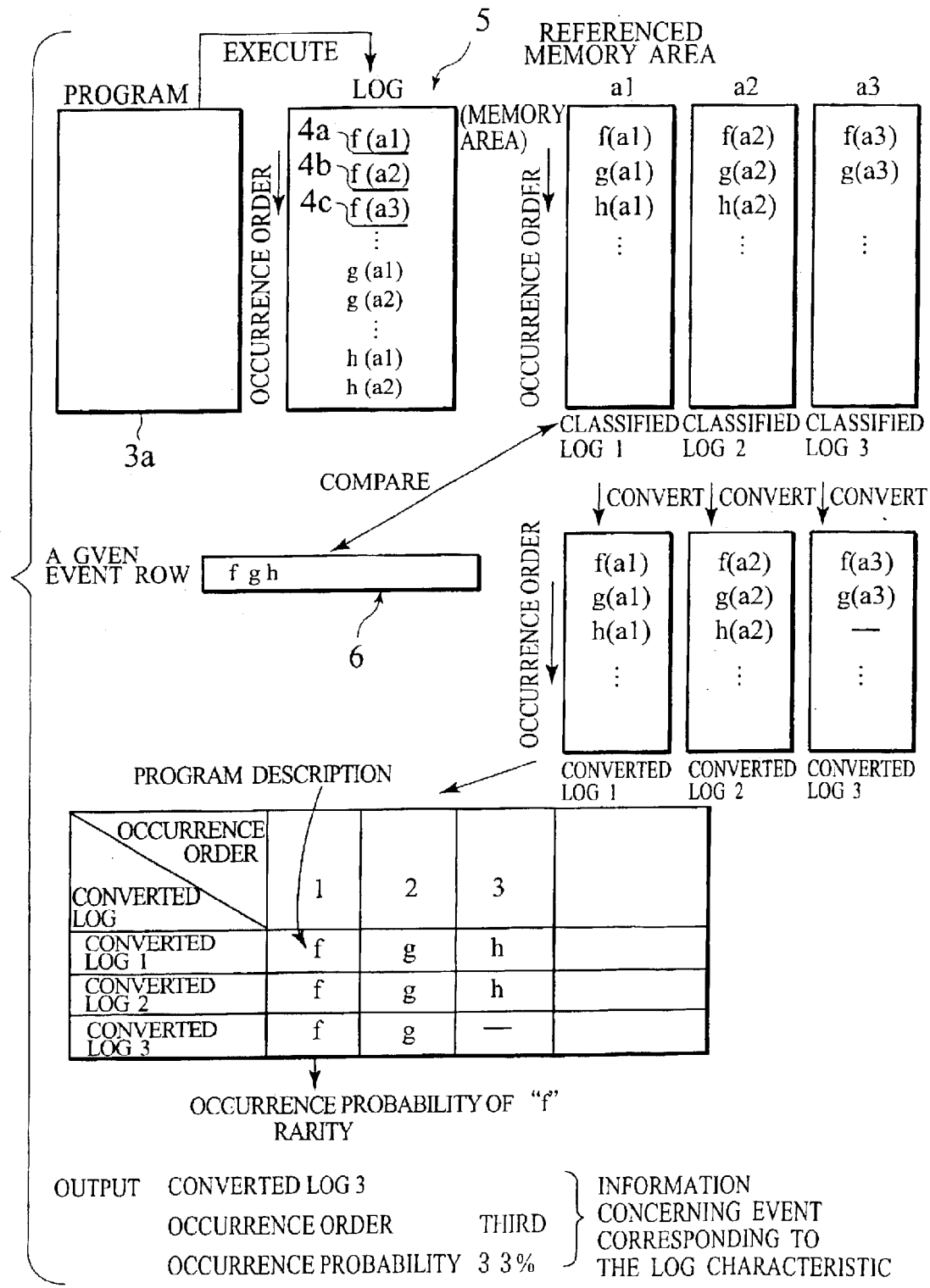
FIG. 2 is a view describing a second concept of the present invention.

Meanwhile, FIG. 2 is a view for describing a second concept of the present invention. A log analysis method of the second concept is a log analysis method for analyzing a log(such as log 5) in which a series of events(such as event 4$a$, event 4$b$, event 4$c$) occurring upon execution of a program(such as program 3$a$) are recorded according to an occurrence order of each of the events, A log analysis method of the second concept includes the following steps. The log analysis method includes the step of classifying each event based on a reference to a memory area(such as memory area a1 memory area a2, memory area a3) being performed upon execution of a program description corresponding to the each event.

The log analysis method includes the step of generating a classified log(such as classified log 1),in each of which one or more events classified as event concerning the reference to the memory area(such as memory areas a1, are recorded according to the occurrence order of each event, for each memory area(such as memory areas a1, memory areas a2, memory areas a3). The respective classified logs (the classified logs 1~3) are generated in this step.

The log analysis method includes the step of generating an event row (such as an event row 6) in which a plurality of events are recorded according to the occurrence order of each of the plurality of events, based on events (such as f(a1), g(a1), h(a1), f(a2), g(a2), h(a2), f(a3), g(a3)) recorded in each of the plurality of classified logs(classified log1~3).

The log analysis method includes the step of comparing each event recorded in the event row(such as an event row 6) with each event recorded in each of the classified logs (classified log1~3) respectively.

The log analysis method includes the step of converting each of the classified logs(classified log1~3) into converted log(converted log1~3) respectively, based on result of the comparison.

The log analysis method includes the step of calculating an event occurrence probability for the occurrence order of each event, based on each program description(such as "f" "g") concerning each event recorded in each of the converted logs.

The log analysis method includes the step of calculating rarity, indicating a level of an occurrence frequency of each event, for the occurrence order of each event, based on each calculated event occurrence probability.

The log analysis method includes the step of outputting information (the log 3, the event of occurrence order (third), event occurrence probability 33%) concerning the event which corresponds to a characteristic included in the converted logs, based on each calculated rarity. Description of embodiment 2 will be carried out based on the above-mentioned concept. Similarly, description of embodiment of a log analysis program 2 will be carried out based on the above-mentioned concept.

Embodiment 1
(Configuration of Log Analysis Device)

Figure 3:
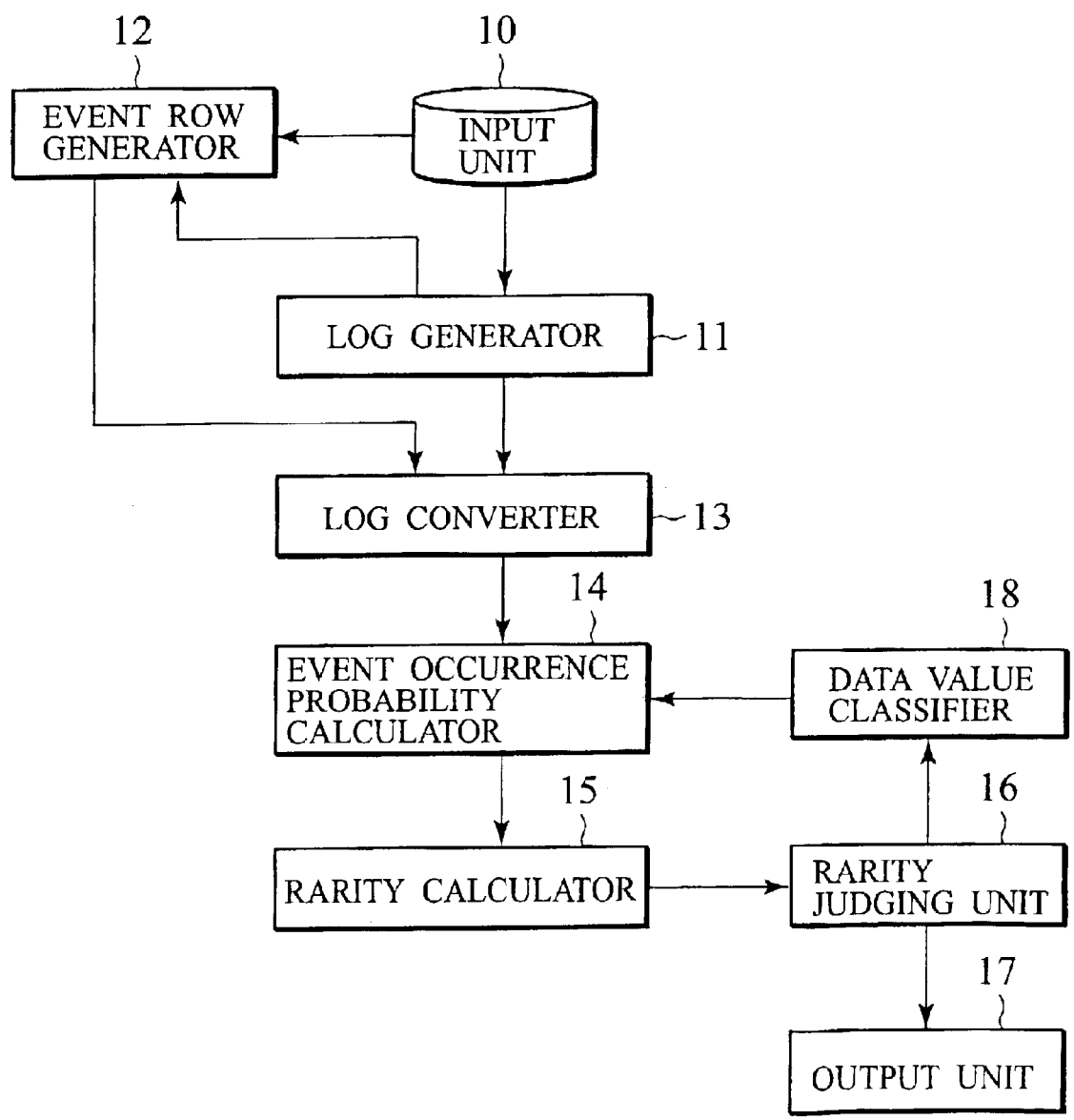
FIG. 3 is a view showing a configuration of a log analysis device according to Embodiment 1.

FIG. 3 is a block diagram showing a configuration of a log analysis device of Embodiment 1. When at least one log is inputted, the log analysis device analyzes the log and outputs information concerning log characteristic, based on various information specified by a debugging operator (hereinafter simply referred to as an operator).

A given debugger (not shown) executes a subject program (hereinafter simply referred to as a program). Then, the debugger has a function of collecting events occurring upon execution of the program, and a function of recording the events. However, a tracer which is a different device from the debugger may have the function of collecting the events and the function of recording the events. The tracer exchanges various data with the debugger when the tracer performs event-collecting processing and/or event-recording processing. Moreover, the tracer traces an execution process of the program. In addition, the tracer records a series of occurring events as "log" according to the occurrence order of each event, for each unit (sequence) of the execution process of the program. Thereafter, the tracer outputs the log in which "the series of events occurring upon execution of the program" are recorded.

In embodiment 1 or in the after-mentioned embodiment 2, description will be made regarding an example in which the debugger has the function of collecting the events, the function of recording the events and the function of outputting the log.

Thereafter, the operator inputs at least one outputted log into the log analysis device. In this embodiment, the type of program(such as the programming language), the amount of the program and the environment upon execution of the program are not particularly limited.

The log analysis device includes an input unit 10 with which the operator inputs a log, a log generator 11 configured to generate a plurality of logs, an event row generator 12, a log converter 13, an event occurrence probability calculator 14, a rarity calculator 15, a rarity judging unit 16, and an output unit 17.

The operator inputs a log through the input unit 10. The log is information in which "a series of events occurring upon execution of the program" are recorded according to the occurrence order of each of the events.

The log generator 11 generates a plurality of logs based on the log inputted by the operator. Concrete description is as follows. For example, the debugger records, as "log", the events which occur as a result of the execution of the same program a plurality of times, according to the occurrence order of each of the events.

Then, the debugger outputs the log in which the events are recorded according to the occurrence order of each event. The operator inputs the log by using the input unit 10. The log generator 11 generates a log for each execution of the program, based on the log inputted to the input unit 10. Each log is an information in which a plurality of events are recorded according to the occurrence order of each of the plurality of events.

The event row generator 12 generates an event row, in which a plurality of events are recorded according to the occurrence order of each of the plurality of events, based on the pattern of the events recorded in each log generated by the log generator 11.

The log converter 13 converts each of the plurality of logs generated by the log generator 11 into each of a plurality of converted logs respectively, by use of the event row generated by the event row generator 12. Concrete processing thereof will be described later.

The event occurrence probability calculator 14 calculates occurrence probability of an event(hereinafter referred to as event occurrence probability) for the occurrence order of each event, based on each program description concerning each event recorded in each of the converted logs. Here, program description is description in the subject program. For example, program description includes program code such as a main function or subroutine function.

The rarity calculator 15 calculates a plurality of rarities based on a plurality of event occurrence probabilities which are calculated by the event occurrence probability calculator 14. The rarity is a degree indicating how rare the occurrence or non-occurrence of an event is. For example, as a value of rarity of a certain event becomes larger, it is possible to say that the occurrence (or non-occurrence) of the event is rarer. To be more precise, the rarity, for example, is a degree indicating a level of the occurrence frequency of each event. The log characteristic in this embodiment is determined based on the rarity value, for example.

The rarity judging unit 16 judges as to whether or not a characteristic (hereinafter is referred to as log characteristic) is included in the plurality of converted logs, based on the rarities calculated by the rarity calculator 15. Concrete processing thereof will be described later.

When the rarity judging unit 16 judges that the log characteristic is included in the plurality of converted logs, the output unit 17 outputs information concerning an event which corresponds to the log characteristic included in the plurality of converted logs.

The information concerning event includes a name of a converted log, contents of the converted log, the occurrence order of event corresponding to the log characteristic, the event occurrence probability of the event, the rarity of the event, and the like.

The log analysis device also includes a data value classifier 18. The data value classifier 18 performs the following process in the case where the rarity judging unit 16 judges that the log characteristic is not included in the plurality of converted logs. Here, the case where the rarity judging unit 16 judges that the log characteristic is not included in the plurality of converted logs is a case where all program descriptions corresponding to all the occurrence orders(the occurrence orders of all events recorded in each log) are identical across the plurality of logs, for example. Here, each program description is associated with each event recorded in each converted log.

The data value classifier 18 generates classification information to classify each event according to a given standard, based on data to be used upon execution of program description corresponding to the event. Then, the data value classifier 18 gives generated classification information to each event. In this embodiment 1, "a log in which a plurality of events with classification information are recorded" will be simply referred to as "a log".

Thereafter, the event occurrence probability calculator 14 calculates an event occurrence probability for the occurrence order of each event(hereinafter "occurrence order of each event" is referred to as "each event occurrence order"), based on the program description concerning event and classification information. Concrete processing thereof will be described later.

Then, the rarity calculator 15 calculates the rarity, which indicates a level of the occurrence frequency (or non-occurrence frequency) of each event, for each event occurrence order, based on the event occurrence probability calculated by the event occurrence probability calculator 14. The rarity judging unit 16 judges as to whether or not log characteristic is included in the plurality of logs, based on the rarities calculated by the rarity calculator 15.

When the rarity judging unit 16 judges that the log characteristic is included in the plurality of logs, the output unit 17 outputs information concerning event which corresponds to the log characteristic included in the plurality of logs.

(Log Analysis Method)

Figure 4:
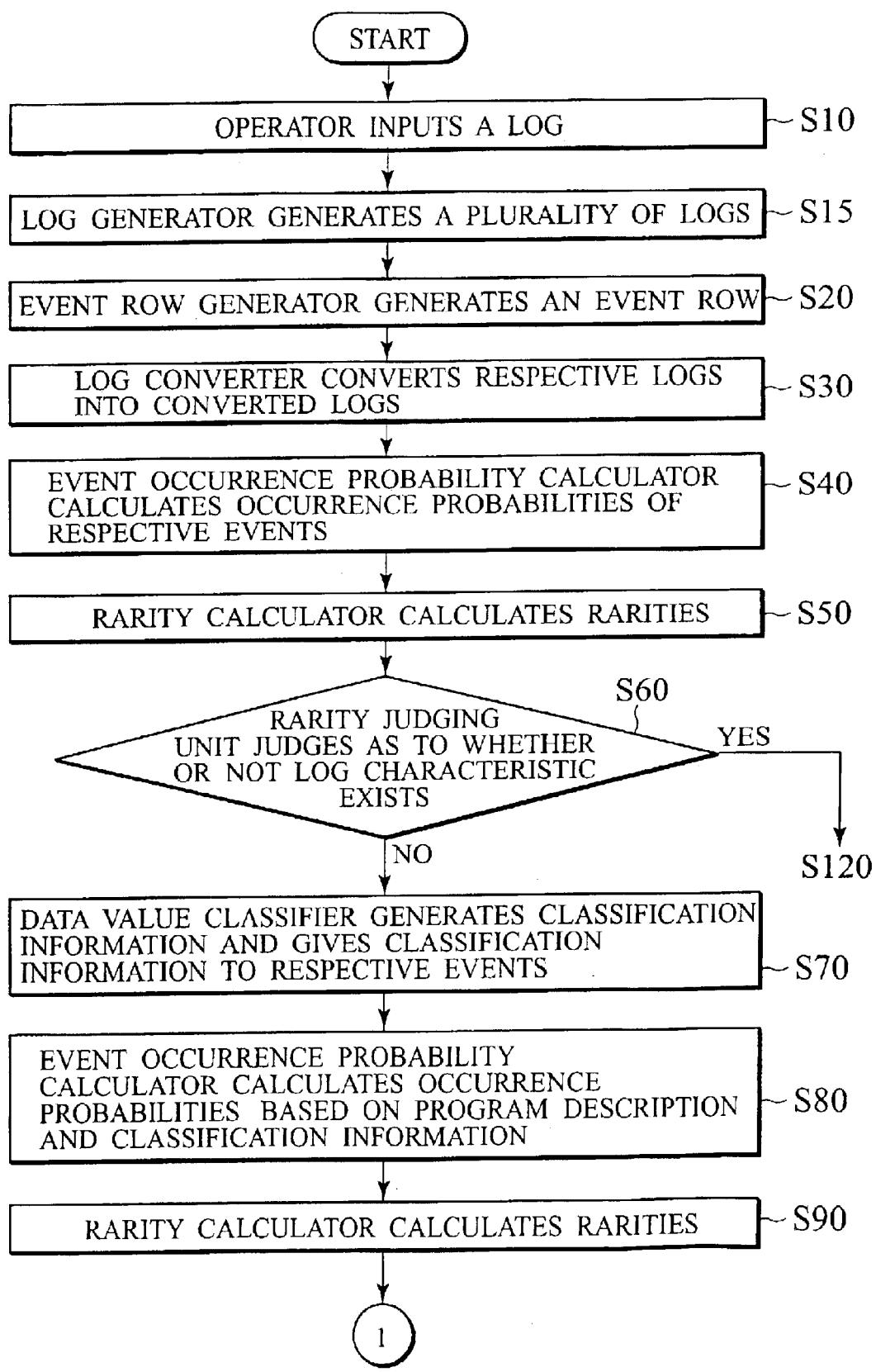
FIG. 4 is a flowchart describing a log analysis method of Embodiment 1.
Figure 5:
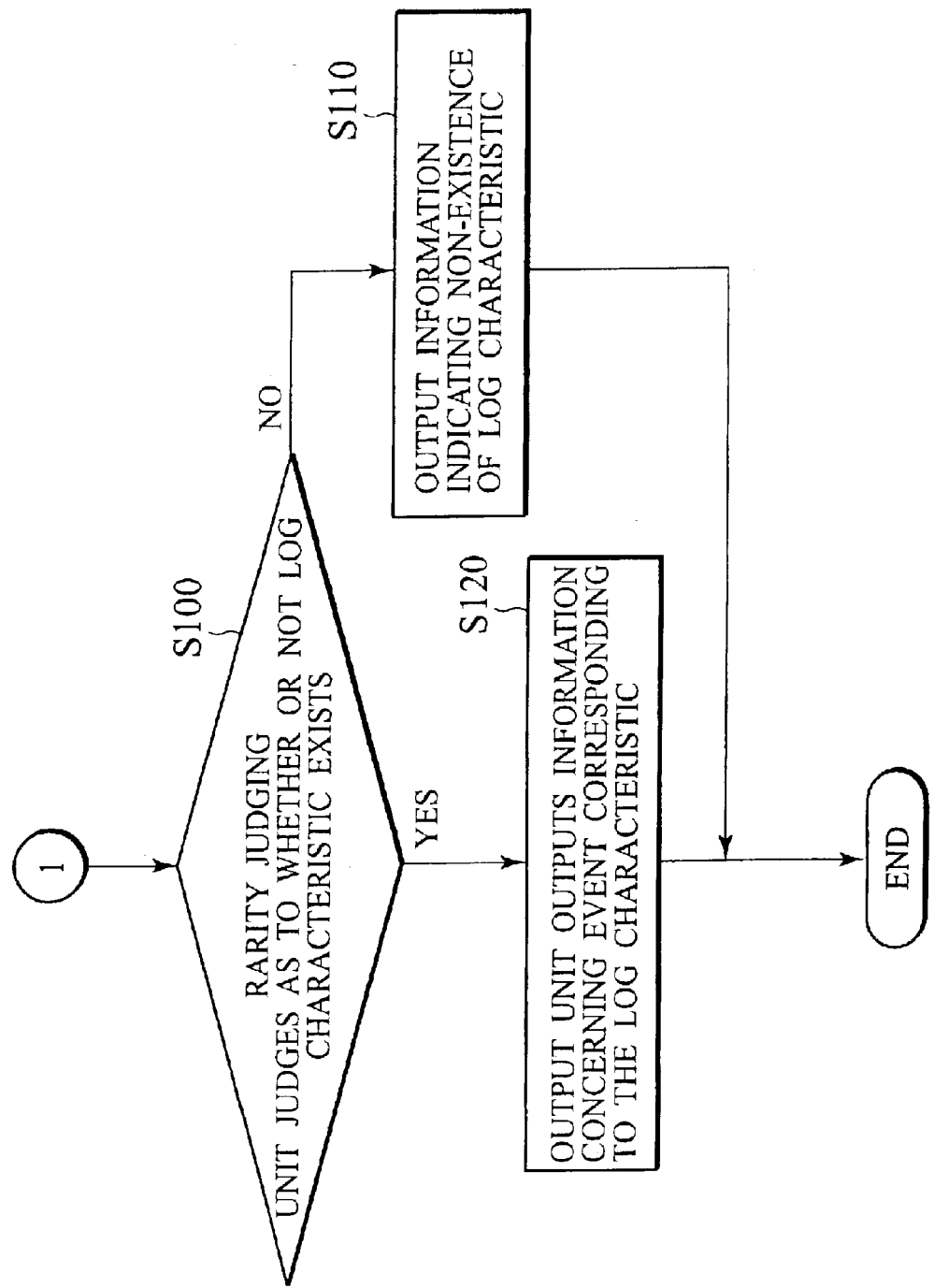
FIG. 5 is another flowchart describing the log analysis method of Embodiment 1.

FIG. 4 is a flowchart describing a log analysis method for use with the log analysis device having the above-described configuration. In this embodiment, as one example, description will be made regarding a method of analyzing a log obtained by execution of a program written in the C language as shown in FIG. 6.

In the program shown in FIG. 6, a function "main" calls a function "f" and a function "k". Parameters for the function "f" and the function "k" are 0, 4, 8, 12 and 16. Both of the function "f" and the function "k" calculate tax values by substituting respective data in a table "price" and respective data in a table "fee" for the function "f" and the function "k" respectively. For example, the debugger executes the same program a plurality of times (five times in the case of the parameters 0, 4, 8, 12 and 16, for example).

Here, code f, code g, code h and code k are program descriptions (such as, function "k"). Meanwhile, an event means an identifiable action which is pre-defined in the entire debugging environment. The identifiable action may be an action of pressing a mouse or an action of operating a key, for example. Then, upon occurrence of an event, a program description(such as function, subroutine function,) corresponding to the event is executed. Thereafter, for example, when a given function is executed, a given parameter is substituted for the given function.

In this specification, the expression "information (such as, program description, parameter) concerning event is recorded" is deemed equivalent to the expression "an event is recorded". Here, there are various methods for recording an event, and the above-mentioned recording methods are just examples. Meanwhile, the expression "an event is recorded" is deemed equivalent to the expression "an event occurs".

Firstly, in step S10, for example, the operator inputs using the input unit 10, a log outputted from the debugger. The debugger, for example, executes the program shown in FIG. 6 a plurality of times (for example, five times concerning to number of parameters (0, 4, 8, 12 and 16) of function "main"). Then, the debugger records, as log, a plurality of events occurring upon the execution of the program according to the occurrence order of each of the plurality of events. Thereafter, the debugger outputs the log. The operator inputs the log using the input unit 10.

In step S15, the log generator 11 generates a plurality of logs based on the inputted log. Concrete processing by the log generator 11 is described below. When the log is inputted by the operator, the log is transmitted to the log generator 11. The log generator 11 generates plural logs, each log being recorded a plurality of events according to the occurrence order of each of the plurality of events in each of the logs, for each execution of the program (i=0, 4, 8, 12 and 16).

In particular, for example, the debugger also records as log, each event occurring upon execution of the program, and information indicating the execution order of the program (hereinafter information indicating the execution order of the program is referred to as "execution order information") corresponding to each event, and outputs the log. Then, the log generator 11 generates the plurality of logs, based on each execution order information.

FIG. 7 is a view showing one example of the plurality of logs generated by the log generator 11. In FIG. 7, each log(log 1~5) is associated with each execution of the program(from the first execution of the program to the fifth execution of the program), respectively.

In step S20, the event row generator 12 generates an event row, in which a plurality of events(or a plurality of items of information concerning an event) are recorded according to the occurrence order of each of the plurality of events, based on the pattern of the events(or the items of information concerning the events) recorded in each log generated by the log generator 11.

One example of concrete processing by the event row generator 12 will be described below. As shown in FIG. 7, a plurality of events are recorded according to the occurrence order of each of the plurality of events, in each of the logs 1 to 5. Moreover, the log generator 11 transmits the generated logs 1 to 5 to the output unit 17. The output unit 17 outputs the respective logs 1 to 5. The operator can know the pattern of the events recorded in each log generated by the log generator 11, by referring to information outputted.

Thereafter, the operator inputs to the input unit 10, the designation of an event row (such as "fghghghghkghghghgh"), in which a plurality of program descriptions are recorded according to the occurrence order of an event corresponding to each program description. The "occurrence order of an event corresponding to each program description" is associated with "execution order of the program description". In this specification, "an occurrence order of an event" means "an execution order of the program description concerning the event".

Moreover, the operator also inputs a request to generate the event row. Here, the event row is information corresponding to a standard for converting the logs into the converted logs (to be described later). In this embodiment, a method of designation of the event row is not particularly limited.

Thereafter, upon receipt of the designation of the event row and the request to generate the event row, the event row generator 12 generates the event row based on the designation of the event row and the request to generate the event row. Then, the event row generator 12 transmits the event row to the log converter 13. Meanwhile, the log generator 11 transmits the plurality of generated logs to the log converter 13.

In step S30, the log converter 13 compares each event (all information concerning an event) recorded in the event row generated by the event row generator 12 with each event (all information concerning an event) recorded in each log. Then, the log converter 13 converts the respective logs into the respective converted logs respectively, based on a result of the comparison. One example of concrete processing by the log converter 13 will be described below.

The log converter 13 compares each program description recorded in the event row with each program description recorded in each log, for each event occurrence order(the execution order of each program description). If a "program description corresponding to a certain event occurrence order recorded in the event row" coincides with a "program description corresponding to the event occurrence order recorded in each log, the log converter 13 records, in each converted log, the program description in association with the event occurrence order.

If a program description corresponding to a certain event occurrence order is not recorded in each log, the log converter 13 records, in each converted log, information "indicating that a program description is not recorded" in association with the event occurrence order.

Hereinafter "event occurrence order is Nth(such as first, second, fifth) order" is referred to as "event occurrence order "Nth "". For example, as shown in FIG. 7, program description corresponding to event occurrence order "second" recorded in log 1, is function "g". Meanwhile, as described above, program description corresponding to event occurrence order "second" recorded in the event row, is function "g". Accordingly, the log converter 13 records, in a converted log, program description "g" in association with the event occurrence order "second". Meanwhile, if a program description corresponding to event occurrence order "nth" is not recorded in a certain log, the log converter 13 records, in a certain converted log, information indicating "– mark" in association with the event occurrence order "nth".

The log converter 13 performs the above-described processing on the respective logs. In this way, the log converter 13 converts the respective logs into the respective converted logs respectively. In each of the converted logs, a plurality of program descriptions are recorded according to the occurrence order of events corresponding to each program description.

Here, "occurrence order of each event corresponding to each program description" means above-described "the occurrence order of each event".

FIG. 8 is a view showing the converted logs 1 to 5 which are converted from the logs 1 to 5 shown in FIG. 7 by the log converter 13. Since all the program descriptions recorded in the event row are recorded in each of the logs 1 to 5, the log converter 13 converts the respective logs 1 to 5 into the respective converted logs 1 to 5 (such as "fghghghghkghghghgh").

On the contrary, if there is a log 5x (such as "fghghghgh( ) ghghghgh"), in which the program description "k" corresponding to the event occurrence order "tenth" is not recorded, the log converter 13 converts the respective logs 1 to 4 and the log 5x into the converted logs 1 to 4 and converted log 5x, as shown in FIG. 9.

There are various other methods that may be used as the converting method by the log converter 13, and the above-described method is one example of such methods. Thereafter, the log converter 13 transmits the respective converted logs to the event occurrence probability calculator 14. Meanwhile, for example, the log converter 13 stores the contents of the respective logs in a register(not shown) built in the log converter 13.

In step S40, the event occurrence probability calculator 14 calculates an event occurrence probability, for each event occurrence order, based on program description concerning each event recorded in each converted log. Here the each event is equivalent to each event recorded in the event row. One example of concrete processing by the event occurrence probability calculator 14 will be described below.

The event occurrence probability calculator 14 references all the program descriptions recorded in each converted log. Then, the event occurrence probability calculator 14 investigates as to whether or not a program description is recorded, for each event occurrence order and for each converted log.

Then, the event occurrence probability calculator 14 calculates an event occurrence probability for each event occurrence order. Each event occurrence probability indicates probability of occurrence of event corresponding to each event occurrence order. In this way, when "an event occurrence probability corresponding to a certain event occurrence order" is outputted to the output unit 17, based on the event occurrence probability, the operator can judge whether or not the occurrence of event is rare for each event occurrence order.

As shown in FIG. 8, a number of converted logs, in each of which program description "f" corresponding to the event occurrence order "first" is recorded, is five. Accordingly, it is possible to say that a number of converted logs in each of which event "f" corresponding to the event occurrence order "first" is recorded, is five. Here, event "f" means an event associated with program description "f". Hereinafter, for example, an event "f"(or, "g", "k" and the like) means an event associated with the program description "f"(or, "g", "k" and the like).

In this case, the event occurrence probability calculator 14 calculates an event occurrence probability as 5/5 (the number of the converted logs including the event "f" corresponding to the event occurrence order "first")/(the total number of the converted logs). Accordingly, in the case of the converted logs shown in FIG. 8, the event occurrence probability calculator 14 calculates occurrence probability corresponding to each event occurrence order, as "1". FIG. 10 is a view showing one example of the results of a calculation calculated by the event occurrence probability calculator 14, in the case of the converted logs shown in FIG. 8. Here, as shown in FIG. 9, a number of converted logs in each of which event "k" corresponding to the event occurrence order "tenth" is recorded, is four, in the case where there is the converted log 5x. In this case, the event occurrence probability calculator 14 calculates event occurrence probability as 4/5 (the number of the converted logs including the event "k" corresponding to the event occurrence order "tenth")/(the total number of the converted logs). FIG. 11 is a view showing one example of the results of a calculation calculated by the event occurrence probability calculator 14, in the case of the converted logs shown in FIG. 9.

Thereafter, the event occurrence probability calculator 14 transmits each event occurrence probability to the rarity calculator 15. Meanwhile, the event occurrence probability calculator 14 stores each event occurrence probability in a register(not shown) built in the calculator 14.

In step S50, the rarity calculator 15 calculates a rarity, which indicates a level of an occurrence frequency (or a non-occurrence frequency) of each event, for each event occurrence order, based on the event occurrence probability calculated by the event occurrence probability calculator 14. Here, rarity is a degree of indicating how rare the occurrence of event (or non-occurrence of event) is. There are various methods for the definition of rarity. In this embodiment, the rarity will be defined by the following formula as an example. The rarity defined in the following formula indicates that occurrence of event (or non-occurrence of event) is rarer, as the value thereof becomes larger.

Assuming that the "event occurrence probability corresponding to a certain event occurrence order" is p, the rarity R1 (lowness of the occurrence frequency of event), which is the degree indicating how rare the occurrence of an event is, will be given by the following formula, for example:

$$R1 = -LOGARITHM(p)$$

here, the code "LOGARITHM" denotes the natural logarithm.

Meanwhile, assuming that the "event occurrence probability corresponding to a certain event occurrence order" is p, the rarity R2 (a level of the non-occurrence frequency of each event), which is the degree indicating how rare the non-occurrence of event is, will be given by the following formula, for example:

$$R2 = -LOGARITHM(1-p)$$

The rarity calculator 15 calculates the rarity R1 in the case where event corresponding to a certain event occurrence order is recorded in a certain log, and associates the rarity R1 with the event occurrence order and the log. The rarity calculator 15 calculates the rarity R2 in the case where event corresponding to a certain event occurrence order is not recorded in a certain log, and associates the rarity R2 with the event occurrence order and the log.

The rarity calculator 15 calculates the rarity R1 or R2 for each converted log and for each event occurrence order. The rarity calculator 15 associates the calculated rarity R1 or R2 with the converted log and event occurrence order.

FIG. 12 is a view showing the results of a calculation calculated by the rarity calculator 15 in the case of the plurality of converted logs shown in FIG. 8. Since events corresponding to all the event occurrence order(from event occurrence order "first" to event occurrence order "eighteenth") are recorded in each of the five converted logs, each rarity corresponding to "each event occurrence order and each converted log" is 0.

FIG. 13 is a view showing the results of a calculation calculated by the rarity calculator 15 in the case of the plurality of converted logs shown in FIG. 9. As shown in FIG. 13, although the rarity "corresponding to event occurrence order "tenth" and each of the converted logs 1~4" is 0.1, the rarity "corresponding to event occurrence order "tenth" and the converted logs 5x" is 0.7.

The rarity calculator 15 associates each calculated rarity with converted log and event occurrence order, and transmits the rarity to the rarity judging unit 16.

In step S60, the rarity judging unit 16 judges as to whether or not a log characteristic is included in the plurality of converted logs, based on the rarities transmitted from the rarity calculator 15. If it is judged that the log characteristic is included in the plurality of converted logs, the processing of step S120 is performed. If it is judged that the log characteristic is not included in the plurality of converted logs, then the rarity judging unit 16 transmits information indicating "that the log characteristic is not included in the plurality of converted logs" to the data value classifier 18. Thereafter, the processing of step S70 is performed.

One example of concrete processing by the rarity judging unit 16 will be described below. In the case where calculation of each rarity as shown in FIG. 12 is performed, the occurrence frequency of each event is high. Therefore, it is possible to say that the occurrence of each event is not rare. In this case, the rarity judging unit 16 judges that the log characteristic is not included in the plurality of converted logs.

On the contrary, as shown in FIG. 13, although the rarity "corresponding to event occurrence order "tenth" and each of the converted logs 1~4" is 0.1, the rarity "corresponding to event occurrence order "tenth" and the converted logs 5x" is 0.7. In this case, since there is a rarity indicating a high value (0.7), the rarity judging unit 16 judges that the log characteristic is included in the plurality of converted logs. In other words, the rarity judging unit 16 judges the log characteristic indicating that the event "k" corresponding to event occurrence order "tenth" is not recorded in the converted log 5x.

The following processing will take place when the rarity judging unit 16 judges that the log characteristic is included in the plurality of converted logs. The rarity judging unit 16 transmits information concerning the log characteristic(such as information indicating the event "k" corresponding to event occurrence order "tenth" is not recorded in the converted log 5x) to the output unit 17.

Meanwhile, the rarity judging unit 16 reads the contents of the converted log 5x from the log converter 13, and transmits the contents to the output unit 17. Moreover, the rarity judging unit 16 reads the event occurrence probability corresponding to event occurrence order "tenth" and the converted log (5x), from the event occurrence probability calculator 14, and transmits the occurrence probability to the output unit 17. Furthermore, the rarity judging unit 16 also transmits the rarity corresponding to event occurrence order "tenth" and the converted log (5x), to the output unit 17.

In step S120, the output unit 17 outputs information concerning an event which corresponds to the log characteristic included in the plurality of converted logs, based on the transmitted information such as the rarity. The information concerning event includes a name of a converted log concerning the log characteristic, contents of the converted log, the event occurrence order concerning the log characteristic, the event occurrence probability(or the event non-occurrence probability) concerning the log characteristic, the rarity concerning the log characteristic, and the like.

One example of concrete processing by the output unit 17 will be described below. The output unit 17 outputs information which is transmitted from the rarity judging unit 16. For example, the output unit 17 outputs information indicating the event "k" corresponding to event occurrence order "tenth" is not recorded in the converted log 5x, the contents of the converted log (5x), the event occurrence order "tenth", the event occurrence probability corresponding to event occurrence order "tenth" and the converted log (5x), the rarity corresponding to event occurrence order "tenth" and the converted log (5x).

In step S70, the data value classifier 18 receives from the rarity judging unit 16, information that the log characteristic is not included in the plurality of converted logs, and performs the following processing. The data value classifier 18 generates classification information, based on data to be used upon execution of program description concerning an event. Then, the data value classifier 18 gives generated classification information to each event.

One example of concrete processing by the data value classifier 18 will be described below. The data value classifier 18 generates the classification information for classifying each event according to a given standard, based on an parameter of each function described in the program, for example. The given standard is a standard as to whether or not data value of an parameter(hereinafter data value of parameter is referred to as parameter value)of each function is equal to or larger than 0, for example.

For example, as shown in FIG. 7, the parameter value (70) of the function "h" corresponding to event occurrence order "fifth" and the log 1, is larger than 0. Accordingly, the data value classifier 18 generates classification information(such as a "+" mark) which indicates that the parameter value is equal to or larger than 0. Then, the data value classifier 18 gives the classification information to the function "h".

Meanwhile, as shown in FIG. 7, the parameter value (−10) of the function "h" corresponding to event occurrence order "ninth" and the log 3, is less than 0. Accordingly, the data value classifier 18 generates the classification information (such as a "−" mark) which indicates that the parameter value is less than 0. Then, the data value classifier 18 gives the classification information to the function "h". FIG. 14 is a view showing one example of each program description with each classification information.

Moreover, the given standard is determined so as to satisfy the following condition. The condition is that, based on each program description with each classification information, the rarity judging unit 16 can judge as to whether or not log characteristic is included in a plurality of logs. The given standard described above is one example that may be used as a given standard determined to satisfy the condition.

For example, a given device can compute the following given standard. The given device can compute the given standard based on a result of statistical processing of the data values. Alternatively, for example, the given device can also compute the given standard by performing a boundary value analysis using a program source code. Here, there may be a plurality of given standards instead of one given standard.

Thereafter, the data value classifier 18 transmits each log with each classification information to the event occurrence probability calculator 14. Meanwhile, the data value classifier 18 stores respective logs with classification information in a register (not shown) built in the data value classifier 18.

In step S80, the event occurrence probability calculator 14 calculates event occurrence probability for each event occurrence order, based on program descriptions (f, g, h and k) concerning an event and data to be used upon the execution of the program descriptions.

Here, "data to be used upon the execution of the program descriptions" includes parameter of function, for example. Then, the data value classifier 18 generates the classification information based on parameter value of each function. The data value classifier 18 gives classification information to each function. For this reason, it may be said that the data to be used upon execution of program description is associated with classification information.

Therefore, to be more precise, the event occurrence probability calculator 14 calculates event occurrence probability for each event occurrence order, based on program descriptions (f, g, h and k) concerning event and classification information (such as, "+" marks, "−" marks).

One example of concrete processing by the event occurrence probability calculator 14 will be described below. The event occurrence probability calculator 14 calculates event occurrence probability corresponding to event occurrence order "first" as follows. Specifically, as shown in FIG. 14, if a number of logs, in each of which program description "h" with classification information "+" corresponding to the event occurrence order "first" is recorded, is five, then the event occurrence probability calculator 14 calculates the event occurrence probability as 5/5 (the number of logs including the event "h" with classification information "+" corresponding to the event occurrence order "first")/(the total number of logs). Hereinafter event "h, f, g" with classification information "+" is referred to as event "h+, f+, g+".

Meanwhile, the event occurrence probability calculator 14 calculates an event occurrence probability corresponding to event occurrence order "ninth" as follows. Specifically, as shown in FIG. 14, if a number of logs, in each of which program description "h" with classification information "+" corresponding to the event occurrence order "ninth" is recorded, is four, then the event occurrence probability calculator 14 calculates the event occurrence probability as 4/5 (the number of logs including the event "h" with classification information "+" corresponding to the event occurrence order "ninth")/(the total number of logs).

FIG. 15 is a view showing the results of a calculation calculated by the event occurrence probability calculator 14, in the case of the logs shown in FIG. 14. The event occurrence probability calculator 14 transmits each event occurrence probability to the rarity calculator 15. Meanwhile, the event occurrence probability calculator 14 stores each event occurrence probability in a register(not shown) built in the calculator 14.

In step S90, the rarity calculator 15 calculates rarity, which indicates a level of an occurrence frequency (or a non-occurrence frequency) of each event, for each event occurrence order, based on the event occurrence probability calculated by the event occurrence probability calculator 14.

The rarity R1 and rarity R2, for example can be represented by the formulae shown in step S50.

One example of concrete processing by the rarity calculator 15 will be described below. For example, the rarity calculator 15 calculates rarity RI for each event occurrence order(from first to eighteenth) as follows. The rarity calculator 15 calculates the rarity R1 in the case where function with classification information "+" is recorded in a certain log. Then, the rarity calculator 15 calculates rarity RI for each event occurrence order and for each log.

For example, the rarity calculator 15 calculates rarity R2 for each event occurrence order(from first to eighteenth) as follows. The rarity calculator 15 calculates the rarity R2 in the case where function with classification information "−" is recorded in a certain log. Then, the rarity calculator 15 calculates rarity R2 for each event occurrence order and for each log.

FIG. 16 is a view showing the results of a calculation calculated by the rarity calculator 15, based on the plurality of logs shown in FIG. 14 and each event occurrence probability shown in FIG. 15. As shown in FIG. 16, the rarity "corresponding to event occurrence order "ninth" and each of the log 1, log2, log4, log5" is 0.1, the rarity "corresponding to event occurrence order "ninth" and the log 3" is 0.7. The rarity calculator 15 associates each calculated rarity with log and event occurrence order, and transmits each rarity to the rarity judging unit 16.

In step S100, the rarity judging unit 16 judges as to whether or not log characteristic is included in the plurality of logs, based on the rarities transmitted from the rarity calculator 15. If it is judged that the log characteristic is included in a plurality of the logs, the processing of step S120 is performed. If it is judged that the log characteristic is not included in the plurality of the logs, the processing of step S110 is performed.

One example of concrete processing by the rarity judging unit 16 will be described below. As shown in FIG. 16, although the rarity "corresponding to event occurrence order "ninth" and log 3" is 0.7, the rarity "corresponding to event occurrence order "ninth" and each of logs 1, 2, 4, 5" is 0.7, all the remaining rarities are 0.

In this case, since the rarity corresponding to the log3 and event occurrence order "ninth" has a high value, the rarity judging unit 16 judges that the characteristic is included in the plurality of logs. Then, the rarity judging unit 16 judges the log characteristic (hereinafter "log characteristic" is simply referred to as "characteristic") indicating that the event "h+" corresponding to event occurrence order "ninth" is not recorded in the log 3.

Thereafter, the rarity judging unit 16 transmits information (such as information indicating that the event "h+" corresponding to event occurrence order "ninth" is not recorded in the log 3) concerning the characteristic to the output unit 17. Meanwhile, the rarity judging unit 16 reads the contents of the log 3 from the data value classifier 18, and transmits the contents to the output unit 17. Moreover, the rarity judging unit 16 reads the event occurrence probability(occurrence probability of event "h+") corresponding to event occurrence order "ninth" and the log3, from the event occurrence probability calculator 14, and transmits the event occurrence probability to the output unit 17. Furthermore, the rarity judging unit 16 also transmits the rarity corresponding to event occurrence order "ninth" and the log 3, to the output unit 17. If it is judged that the characteristic is not included in the plurality of logs, the rarity judging unit 16 transmits information indicating that the characteristic is not included in the plurality of logs to the output unit 17.

In step S110, the output unit 17 outputs information indicating that the characteristic is not included in the plurality of logs. In this way, the operator can input an other log into the input unit 10, or input information indicating change of the given standard into the input unit 10.

In step S120, the output unit 17 outputs information concerning event which corresponds to the characteristic included in the plurality of logs, based on the transmitted information. For example, the "information concerning event" includes information indicating that the event "h+" corresponding to event occurrence order "ninth" is not recorded in the log 3, contents of the log 3, the event occurrence order "ninth", the event occurrence probability of event "h+", the rarity and the like.

For this reason, in the case where the operator debugs the program by examining log, the information outputted from the output unit 17 is useful information for the operator. The operator can examine the log by considering above the characteristic. Accordingly, it is possible for the operator to perform a debugging operation efficiently. For example, the operator can perform a debugging operation concerning the program description (that is, description indicating that a data value less than 0 is used as parameter of function "h"), which is related to event occurrence order "ninth", based on the information indicating that the event "h+" corresponding to event occurrence order "ninth" is not recorded in the log 3.

It is deemed rare that the event "h+" corresponding to event occurrence order "ninth" is not recorded in the log 3. Accordingly, it is likely that the fact "the event "h+" corresponding to event occurrence order "ninth" is not recorded in the log 3" may be associated with a program bug. As a consequence, the operator can efficiently perform the debugging operation.

In the processing from step S10 to step S60, log analysis processing is performed without considering data value (parameter value). The reason is as follows. In order that the log analysis device extracts the log characteristic accurately, the log analysis device needs to place priority on considering "function (program description)" and "execution order of function(event occurrence order)" over "data value". As a consequence, in this embodiment, log analysis device can extract the log characteristic by appropriately considering data to be used upon the execution of the program.

(Operation and Effect)

In this embodiment, the event occurrence probability calculator 14 calculates an event occurrence probability, for each event occurrence order, based on each program description concerning each event recorded in each of the converted logs. Moreover, the rarity calculator 15 calculates a rarity for each event occurrence order, based on the event occurrence probability calculated by the event occurrence probability calculator 14. The rarity judging unit 16 judges as to whether or not occurrence or non-occurrence of the event is rare, for each event occurrence order, and judges as to whether or not log characteristic is included in the plurality of converted logs. When it is judged that log characteristic is included in the plurality of converted logs, the output unit 17 outputs the information concerning the log characteristic.

In this way, based on the rarity, the log analysis device of this embodiment firstly judges as to whether or not the log characteristic is included in the plurality of converted logs, without considering data to be used upon execution of program description. Then, even when it is judged that the log characteristic is not included in the plurality of converted logs, the log analysis device efficiently performs a log analysis processing in the following manner.

The event occurrence probability calculator 14 calculates an event occurrence probability for each event occurrence order, based on program descriptions concerning an event and data to be used upon the execution of the program descriptions. The rarity calculator 15 calculates a rarity for each event occurrence order, based on the event occurrence probability calculated by the event occurrence probability calculator 14. The output unit 17 outputs the information concerning the log characteristic, based on the event occurrence probability or the rarity.

Accordingly, the log analysis device of this embodiment calculates the event occurrence probability and/or the rarity by appropriately considering data in addition to the program description and event occurrence order (execution order of program description). Then, the log analysis device can extract the log characteristic based on the event occurrence probability or the rarity.

As a consequence, even if the log characteristic is not extracted in spite of considering the program description and the event occurrence order, the operator does not have to examine another log for input and does not have to examine another log analysis method again. In this way, by using the log analysis device of this embodiment the operator can obtain the log characteristic promptly.

Therefore, the log analysis device and the log analysis method of this embodiment can provide the operator with more useful information for the debugging operation, as compared to the prior art.

(Modified Example 1 of Embodiment 1)

Incidentally, the log analysis device may include a judging unit (not shown) configured to judge as to whether or not all program descriptions corresponding to all event occurrence order are identical across a plurality of logs.

After step S15, the judging unit performs the above judgment regarding the plurality of logs. Then, when the judging unit judges that all program descriptions corresponding to all event occurrence order are identical across the plurality of logs, the log analysis device may perform the processing from step S70 to step S120 instead of performing the processing from step S20 to step S60. To be more precise, the judging unit judges as to whether each program description (such as f and g) corresponding to each event occurrence order(from first to eighteenth) is identical across the plurality of logs(log1~log5) shown in FIG. 7, for example. Here, it can be said that the log characteristic will not be extracted if the log analysis device performs the log analysis by considering only program descriptions.

For this reason, the above-described judgment is performed by the judging unit. Meanwhile, when the judging unit judges that each program descriptions corresponding to each event occurrence order is identical across the plurality of logs, the log analysis device performs the processing from step S20 to step S60.

(Modified Example 2 of Embodiment 1)

The log analysis device may include a characteristic value calculator (not shown). The characteristic value calculator can calculate a characteristic value of a log, for each log (such as, each converted log), based on the event occurrence probability calculated by the event occurrence probability calculator 14.

Here, for example, the characteristic value of a log indicates the degree, from among a plurality of logs, the log may contain a distinguishing characteristic. Hereinafter "characteristic value of log" is referred to as simply "characteristic value".

For example, the following processing may take place after each event occurrence probability is calculated in step S80. Specifically, the event occurrence probability calculator 14 transmits each occurrence probability to the characteristic value calculator. When an event corresponding to a certain event occurrence order is recorded in a certain log, the characteristic value calculator associated the event occurrence probability with the event occurrence order and the log. When an event corresponding to a certain event occurrence order is not recorded in a certain log, the characteristic value calculator associates event non-occurrence probability with the event occurrence order and the log. Here, for, example, "event non-occurrence probability" T is defined as the following expression.

$$T=1-p$$

Here, "p" is event occurrence probability.

In this way, the characteristic value calculator generates a matrix. In the matrix, as shown in FIG. 17, each event occurrence probability is associated with event occurrence order and log, or each event non-occurrence probability is associated with event occurrence order and log.

Then, the characteristic value calculator calculates a characteristic value for each log in the following manner. Specifically, as shown in FIG. 17, the characteristic value calculator calculates the characteristic value by multiplying from "event occurrence probability" or "event non-occurrence probability" corresponding to event occurrence order "first" to event occurrence probability" or "event non-occurrence probability" corresponding to event occurrence order "18th", for example, For example, in the case of each event occurrence probability in FIG. 15, the characteristic value of each of logs 1, 2, 4 and 5 is 0.8, but the characteristic value of the log 3 is 0.2 as shown in FIG. 17. When these characteristic values are outputted by the output unit 17, the operator can judge that the log 3 is a log concerning "characteristic". Similarly, processing of calculating the characteristic values of the respective converted logs, and processing of outputting the characteristic values of the respective converted logs may take place after each event occurrence probability are calculated in step S40, for example.

Moreover, the characteristic value calculator can also calculate the characteristic value for each log, based on each rarity calculated by the rarity calculator 15. For example, the following processing may take place after the respective rarities are calculated in step S90.

The rarity calculator 15 transmits the rarities to the characteristic value calculator. The characteristic value calculator calculates a characteristic value for each log in the following manner. Specifically, as shown in FIG. 18, the characteristic value calculator calculates the characteristic value by adding from a rarity corresponding to event occurrence order "first" to a rarity corresponding to event occurrence order "18th". For example, in the case of each rarity shown in FIG. 16, the characteristic value of each of logs 1, 2, 4 and 5 is 0.1 but the characteristic value of the log 3 is 0.7, as shown in FIG. 18. When these characteristic values are outputted by the output unit 17, the operator can judge that the log 3 is a log concerning "characteristic". Similarly, after the respective rarities are calculated in step S50, for example, processing of calculating the characteristic values of the respective converted logs, and processing of outputting the characteristic values of the respective converted logs may take place. In this way, if the characteristic values of the respective converted logs (or the characteristic values of the respective logs) are outputted to the operator, then the operator can know the log characteristic promptly.

Embodiment 2

A log analysis device of Embodiment 2 performs a log analysis by considering a reference to a memory area being performed when each event occurs, and extracts log characteristic.

Figure 19:
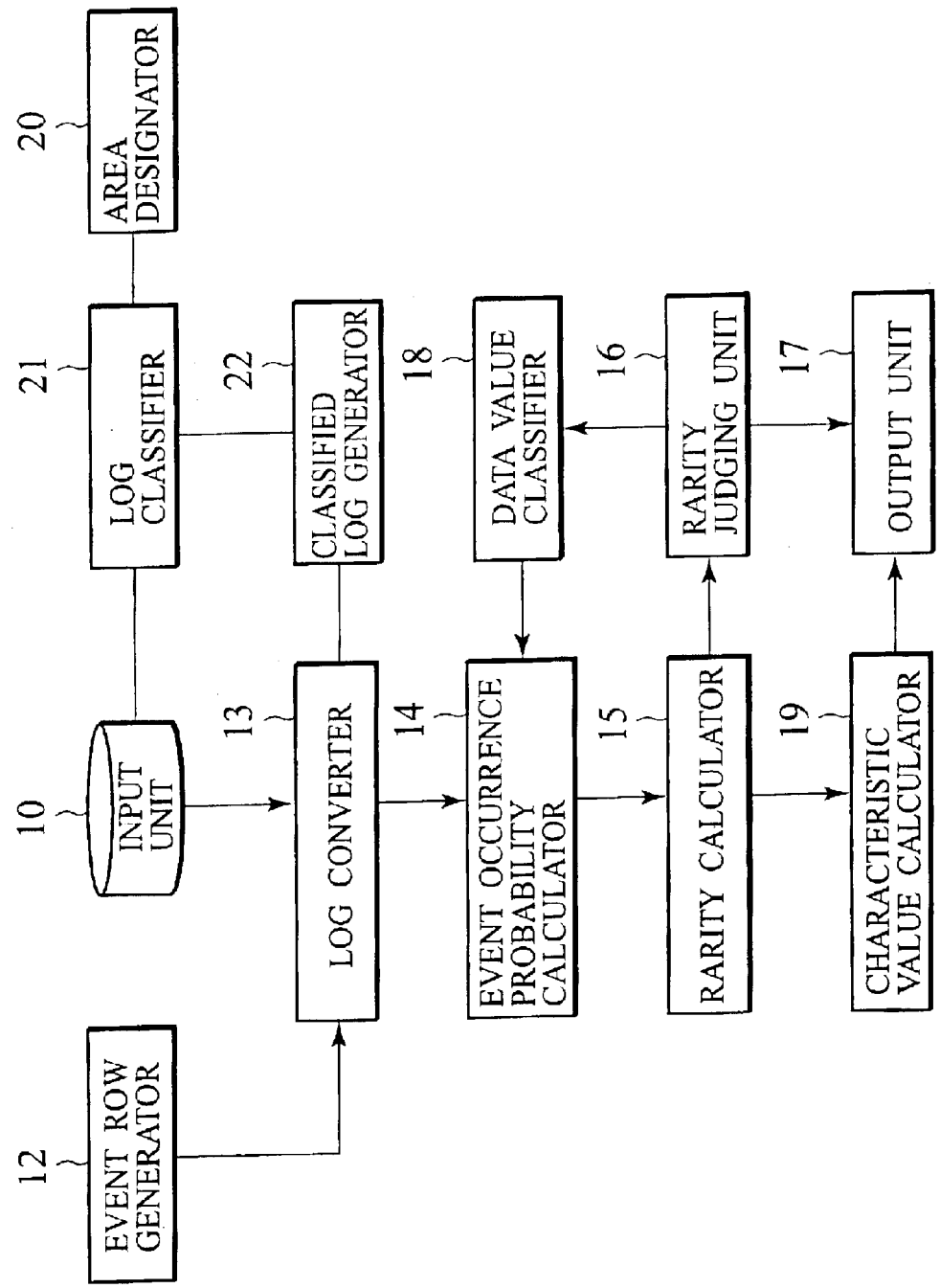
FIG. 19 is a view showing a configuration of a log analysis device according to Embodiment 2.

FIG. 19 is a view showing a configuration of the log analysis device of Embodiment 2. In FIG. 19, the same constituents as those in Embodiment 1 are denoted with the same reference numerals. Moreover, in FIG. 19, description of substantially the same constituents as those in Embodiment 1 will be omitted. The log analysis device of Embodiment 2 is different from the log analysis device of Embodiment 1 in the following points.

The log analysis device includes an area designator 20, a log classifier 21, a classified log generator 22, and a characteristic value calculator 19. The log analysis device of this Embodiment 2 does not include a log generator 11 of Embodiment 1.

An operator designates a memory area to be referenced upon execution of a program description concerning an event, by use of the area designator 20. For example, the operator designates an array variable described in the program by use of the area designator 20.

For example, when a debugger executes respective functions, the debugger records information (such as addresses of the memory areas and variables) concerning memory areas referenced upon execution of the respective functions as a "log". For this reason, when the operator recognizes in advance of a bug within a description concerning a certain array variable, the operator designates the array variable, by use of the area designator 20. The reason for such designation is to increase the possibility of extraction of log characteristic.

"Data is substituted for a variable (such as an array variable) in program" means "data is stored in a given area in a memory". For this reason, designation of a variable (such as an array variable) means designation of a memory area in this embodiment. In the following description, a variable such as an array variable will be regarded as similar to memory area.

The log classifier 21 classifies each event based on a reference to a memory area designated by the area designator 20, being performed upon the occurrence of each event. The classified log generator 22 generates a classified log for each memory area. In this case, the classified log is a log in which one or more events that are "classified as events concerning the reference to the memory area, are recorded according to the occurrence order of each of the events. The characteristic calculator calculates a characteristic value for each converted log, based on rarities calculated by a rarity calculator 15.

Here, the characteristic value means a characteristic value of modified example 1 of embodiment 1. Meanwhile, an event row generator 12 generates an event row based on the pattern of events recorded in each classified log generated by the classified log generator 22. Moreover, a log converter 13 converts the respective classified logs into the respective converted logs.

(Log Analysis Method)

Figure 20:
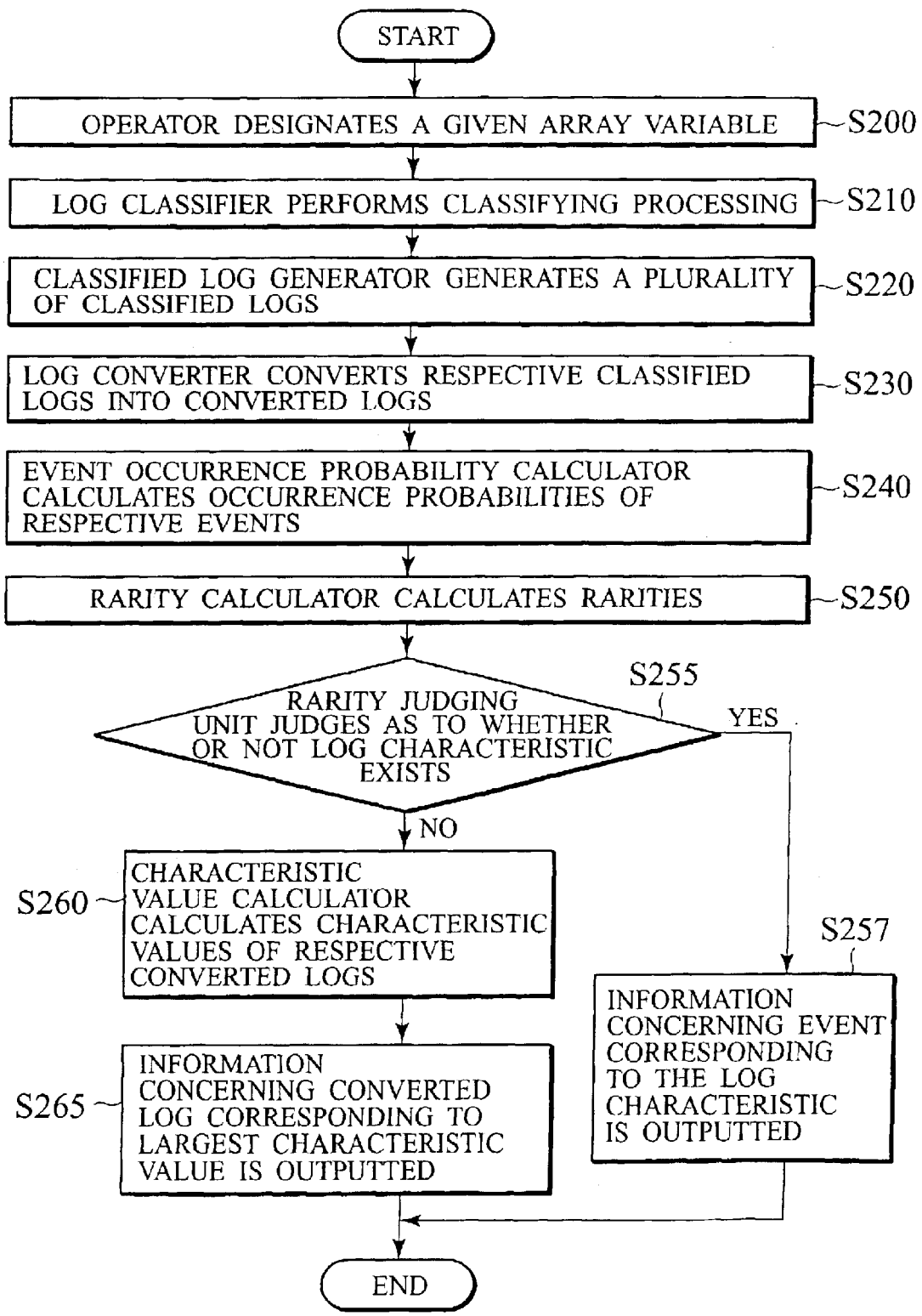
FIG. 20 is a flowchart describing a log analysis method of Embodiment 2.

FIG. 20 is a flowchart showing a log analysis method using the above-described log analysis device. In this embodiment, as one example, description will be made regarding method of analyzing a log obtained by execution of a program written in the C language as shown in FIG. 21.

In the program, a function "main" calls a function "init" twelve times (i=1 to 12), a function "clean" three times (i=4, 8 and 12), and a function "calc" four times (i=3, 6, 9 and 12).

Hereinafter, "a memory area is referenced upon the execution of a function (program description)" is referred to as "a function references a memory area".

In the program, if the function "clean" has referenced a given memory area, then the function "calc" is not allowed to reference the given memory area. To be more precise, in the program, the function "calc" is not allowed to reference the memory area corresponding to "vals (12)". However, in FIG. 21, there is description indicating that the function "calc" references the memory area corresponding to "vals (12)". The description is associated with program bug. In the following manner, it is possible to output information concerning the program bug as log characteristic.

Firstly, in step S10 as shown in Embodiment 1, the operator input a log, which is outputted from a debugger, for example, by using the input unit 10. FIG. 22 is a view showing a log obtained as a result of execution of the program (the program shown in FIG. 21) by the debugger, for example. In the log, a plurality of events occurring upon execution of the program are recorded.

Moreover, for example, if the operator could only obtain a log such as that shown in FIG. 22, or if the operator thinks that there may be a program bug concerning reference to a given array variable, then the operator inputs, using input unit 10, information "indicating that the operator could only obtain a log such as that shown in FIG. 22" or information "indicating that there may be a program bug concerning reference to a given array variable". The inputted information is transmitted to the respective units. The respective units perform the following processing instead of the processing in Embodiment 1.

In step S200, the operator designates a given array variable described in the program, by use of the area designator 20. Here, the operator may designate a memory area corresponding to the given array variable, by use of the area designator 20. In this case, for example, an output unit 17 may output an instruction to designate a given array variable. Moreover, the operator may designate the given array variable, by use of the area designator 20 based on the instruction.

To be more precise, when the operator obtains the log shown in FIG. 22, the operator designates each array variable "vals (1)"~"vals(12)") by use of the area designator 20, for example. Each array variable may be a global array variable which can be referenced by all the functions described in the program. The designator 20 transmits all the designated array variables to the log classifier 21. Meanwhile, the log inputted by the input unit 10 is transmitted to the log classifier 21.

In step S210, the log classifier 21 classifies each event for each designated array variable, based on a reference to an array variable designated by the area designator 20, being performed upon the occurrence of above each event. One example of concrete processing by the log classifier 21 will be described below.

For example, a program description referencing to the array variable "vals (1)" is "init:vals (1)". A program description referencing to the array variable "vals (2)" is "init:vals (2)". Program descriptions referencing to the array variable "vals (3)" are "init:vals (1)" and "calc:vals (3)".

Here, classification of an event will be deemed equivalent to classification of a program description concerning an event.

The log classifier 21 classifies each program description, based on a reference to each of the designated variables vals [i], being performed upon execution of each program description "init:vals (i) (i=1 to 12)". Results of classification by the log classifier 21 are transmitted to the classified log generator 22.

In step S220, the classified log generator 22 generates a classified log for each designated array variable. In this case, the classified log is a log in which one or more events that are "classified as events concerning the reference to the memory area, are recorded according to the occurrence order of each of the events.

Concrete processing by the classified log generator 22 will be described below. As shown in FIG. 23, the classified log generator 22 generates a classified log 1, based on the results of classification transmitted from the log classifier 21.

For example, the classified log 1 is a log in which program description("init:vals (1)") classified as having reference to the designated array variable ("vals (1)") performed, is recorded according to the event occurrence order(first). In this way, the classified log generator 22 generates a plurality of classified logs(classified log 1 to 12). Thereafter, the classified log generator 22 transmits the plurality of classified logs to the log converter 13.

In step S230, the log converter 13 converts the respective classified logs into the converted logs. One example of concrete processing by the log converter 13 will be described below. Based on the plurality of transmitted classified logs, the log converter 13 instructs the event row generator 12 to generate a given event row.

The event row generator 12 generates the event row based on the pattern of events recorded in each classified log generated by the classified log generator 22. For example, when the plurality of classified logs shown in FIG. 23 are transmitted, the event row generator 12 generates an event row (init:vals, clean:vals, calc:vals), in which "program descriptions recorded in each classified log" are recorded according to each event occurrence order (for example, occurrence order of event "init:vals" is first, occurrence order of event "clean:vals" is second).

The log converter 13 performs the following processing for each event occurrence order. The log converter 13 compares each program description (program description concerning event) which is recorded in the event row, with each program description which is recorded in each classified log. Then, if a "program description corresponding to a certain event occurrence order recorded in the event row" coincides with a "program description corresponding to the event occurrence order recorded in each log, the log converter 13 records, in each converted log, the program description in association with the event occurrence order.

If a program description corresponding to a certain event occurrence order is not recorded in each log, the log converter 13 records, in each converted log, information (such as "– mark") "indicating that a program description is not recorded" in association with the event occurrence order.

For example, in a classified log 1, program description corresponding to event occurrence order "first" is "int; vals" (an element number is omitted). In the event row, program description corresponding to event occurrence order "first" is "int; vals". Therefore, the log converter 13 records, in a converted log 1, program description "int; vals" in association with the event occurrence order "first".

Meanwhile, when a program description corresponding to event occurrence order "second" is not recorded in classified log 1, the log converter 13 records, in a converted log 1, information indicating "– mark" in association with the event occurrence order "second".

Moreover, the log converter 13 judges that a "program description (calc:vals) corresponding to event occurrence order "second" recorded in classified log 3 does not coincide with a "program description (clean:vals) corresponding to the event occurrence order "second" recorded in the event row. Then, the log converter 13 judges that a "program description(calc:vals) corresponding to event occurrence order "second" recorded in classified log 3 coincides with a "program description (calc:vals) corresponding to the event occurrence order "third" recorded in the event row. Then, the log converter 13 records, in a converted log 3, the program description (calc:vals) in association with the event occurrence order "third". In this case, the log converter 13 records, in a converted log 3, information indicating "–mark" in association with the event occurrence order "second".

According to the above-described conversion rules, the log converter 13 converts the classified logs (classified log1 to 5) as shown in FIG. 23 into the converted logs(converted log 1 to 5) as shown in FIG. 24 respectively, for example. In this embodiment, it is to be noted that the converting method by the log converter 13 is not particularly limited to the above-described method. The log converter 13 transmits the respective converted logs to the event occurrence probability calculator 14. Moreover, the log converter 13 stores the contents of the respective converted logs in a register(not shown) built in the converter 13.

In step S240, the event occurrence probability calculator 14 calculates an event occurrence probability, for each event occurrence order, based on the program description concerning each event recorded in each of the converted logs. One example of concrete processing by the event occurrence probability calculator 14 will be described below.

As shown in FIG. 24, a number of converted logs, in each of which program description "init;vals" corresponding to the event occurrence order "first" is recorded, is twelve. Accordingly, it is possible to say that a number of converted logs in each of which event "init;vals" corresponding to the event occurrence order "first" is recorded, is twelve. Hereinafter, event corresponding to program description "init;vals", "clean:vals", "calc:vals" is referred to as event "int", event "clean", event "calc".

In this case, the event occurrence probability calculator 14 calculates event occurrence probability as 12/12 (the number of the converted logs including the event "init" corresponding to the event occurrence order "first")/(the total number of the converted logs). Similarly, the event occurrence probability calculator 14 calculates event occurrence probability of event "clean" as 3/12 (the number of the converted logs including the event clean corresponding to the event occurrence order "second")/(the total number of the converted logs).

Similarly, the event occurrence probability calculator 14 calculates event occurrence probability of event "calc" as 4/12 (the number of the converted logs including the event "calc" corresponding to the event occurrence order "third")/(the total number of the converted logs). FIG. 25 is a view showing one example of the results of a calculation calculated by the event occurrence probability calculator 14, in the case of the converted logs shown in FIG. 24. Thereafter, the event occurrence probability calculator 14 transmits each event occurrence probability to the rarity calculator 15. Meanwhile, the event occurrence probability calculator 14 stores each event occurrence probability in a register(not shown) built in the calculator 14.

In step S250, the rarity calculator 15 calculates a rarity, which indicates a level of the occurrence frequency (or a non-occurrence frequency) of each event, for each event occurrence order, based on the event occurrence probability calculated by the event occurrence probability calculator 14. To be more precise, the rarity calculator 15 calculates rarity R1 or rarity R2 in a similar manner to Embodiment 1.

FIG. 26 is a view showing results of the rarities calculated by the rarity calculator 15 based on the converted logs(log 1 to 12) as shown in FIG. 24, for example. The rarity calculator 15 associates each calculated rarity with converted log and event occurrence order, and transmits each rarity to the rarity judging unit 16.

In step S255, the rarity judging unit 16 judges as to whether or not log characteristic is included in the plurality of converted logs, based on the rarities transmitted from the rarity calculator 15. If it is judged that the log characteristic is included in the plurality of converted logs, the rarity judging unit 16 obtains information concerning the log characteristic from respective units, as similar to embodiment 1. Then, the rarity judging unit 16 transmits a variety of items of information to the output unit 17. Thereafter, the processing of step S257 is performed.

In step S257, the output unit 17 outputs the information concerning the log characteristic. If it is judged that the log characteristic is not included in the plurality of converted logs, the processing of step S260 is performed. For example, as shown in FIG. 26, when there are many rarities which have large value(such as 0.6), the rarity judging unit 16 judges that the log characteristic is not included in the plurality of converted logs. Then rarity judging unit 16 transmits information indicating the judgment and each rarity corresponding to "converted log and event occurrence order", to the characteristic value calculator 19.

In step S260, the characteristic value calculator 19 calculates the characteristic values of the respective converted logs, based on the respective transmitted rarities. One example of concrete processing by the characteristic value calculator 19 will be described below. Meanwhile, the contents of all the converted logs are transmitted from the log converter 13 to the characteristic value calculator 19. Moreover, the each event occurrence probability is transmitted from the event occurrence probability calculator 14 to the characteristic value calculator 19.

The characteristic value calculator 19 calculates a characteristic value for each converted log in the following manner. Specifically, the characteristic calculator 19 calculates a characteristic value by finding a sum of the rarity corresponding to each event occurrence order.

For example, in the case of the rarities shown in FIG. 26, the characteristic value calculator 19 calculates a characteristic value of the converted log 1, as 0 (the rarity corresponding to event occurrence order "first")+0.12 (the rarity corresponding to event occurrence order "second") +0.17 (the rarity corresponding to event occurrence order "third")= 0.29, as shown in FIG. 27. FIG. 27 is a view showing results of characteristic values of the converted logs 1 to 12, which are calculated by the characteristic value calculator 19 in the above-described manner.

The characteristic value calculator 19 transmits the information concerning the largest characteristic value among the calculated characteristic values. For example, the characteristic value calculator 19 to the output unit 17a, name of the converted log corresponding to the largest characteristic value, the contents of the converted log, the rarity corresponding to each event occurrence order and the converted log, and the largest characteristic value. For example, if the log 12 has a higher characteristic value of 1.08, in comparison with other converted logs as shown in FIG. 27, the characteristic value calculator 19 transmits the information concerning the converted log 12 (such as the name of the converted log 12) to the output unit 17.

In step S265, the output unit 17 outputs the information concerning the converted log corresponding to the largest characteristic value (such as, the name of the converted log, the characteristic value of the converted log, the contents of the converted log, and the rarity corresponding to each event occurrence order and the converted log, for example). In the case when the converted log corresponding to the largest characteristic value does not exist (such as the case when all the characteristic values of the converted logs are 0), then the following processing may take place. Specifically, information concerning each of the converted logs is transmitted from the characteristic value calculator 19 to the output unit 17. Then, the output unit 17 outputs the information concerning each of the converted logs.

The information outputted from the output unit 17 is useful information for the operator. The operator can examine a certain converted log by considering the above log characteristic. Accordingly, it is possible for the operator to perform a debugging operation efficiently.

By using the area designator 20, instead of designating the array variables "vals (1)" to "vals (1)", the operator can designate the array variables vals (1) (such as "vals (3)", "vals (6)", "vals (9)" and "vals (12)") which are referenced by the function "calc".

For example, if the converted log corresponding to the largest characteristic value is not be outputted in step S265, the operator can also designate other array variables different from the array variables that have been designated already, by use of the area designator 20. Then, the processing may be started again from step S210 and so forth.

The characteristic value calculator 19 can also calculate the characteristic value for each converted log based on the event occurrence probability, which is calculated by the event occurrence probability calculator 14, as similar to Modified Example 2 of Embodiment 1. In addition, the output unit 17 may output the calculated characteristic values of the respective converted logs. For example, as shown in FIG. 28, the characteristic value calculator 19 may generate a matrix in which each event occurrence probability or each event non-occurrence probability are associated with log and event occurrence order, as similar to Modified Example 2 of Embodiment 1.

Moreover, the characteristic value calculator 19 calculates a characteristic value for each converted log, as similar to Modified Example 2 of Embodiment 1 as follows. Specifically, the characteristic value calculator 19 calculates a characteristic value by multiplying event occurrence probability or event non-occurrence probability corresponding to each event occurrence order, with each other. In addition, the output unit 17 may output information concerning the converted log corresponding to the smallest characteristic value among the calculated characteristic values.

Furthermore, the log analysis device of Embodiment 2 may include a judging unit having a function described below. The judging unit judges as to whether or not all program descriptions corresponding to all event occurrence order are identical across a plurality of classified logs.

Then, when the judging unit judges that all program descriptions corresponding to all event occurrence order are identical across the plurality of classified logs, the log analysis device may perform the following processing. The log analysis device may perform the processing from step S70 to step S120, while considering data stored in a memory areas corresponding to an array variable.
(Operation and Effect)

According to this embodiment, the operator designates memory area(array variable) to be referenced upon execution of program description concerning event, by using the area designator 20. Moreover, the classified log generator 22 generates a classified log for each memory area (designated array variable). In this case, the classified log is a log in which one or more events that are classified as events concerning the reference to the designated memory area, are recorded according to event occurrence order of each of the events.

Then, the log converter 13 converts the classified logs into the converted logs. Thereafter, based on program description concerning an event, the event occurrence probability calculator 14 calculates an event occurrence probability for each event occurrence order. Then, the rarity calculator 15 calculates a rarity for each event occurrence order, based on the event occurrence probability calculated by the event occurrence probability calculator 14. Thereafter, the output unit 17 outputs the information concerning the log characteristic, based on the event occurrence probability or rarity.

For this reason, the log analysis device of this embodiment calculates the event occurrence probability and/or rarity by appropriately considering instances of reference to memory area in addition to program description and event occurrence order (execution order of program description). Then, the log analysis device can extract the log characteristic based on the event occurrence probability or rarity.

As a consequence, even if the log characteristic is not extracted in spite of considering the program description and the event occurrence order, the operator does not have to examine another log for input or does not have to examine another log analysis method again. In this way, by using the log analysis device of this embodiment the operator can obtain the log characteristic promptly.

Therefore, the log analysis device and the log analysis method of this embodiment can provide the operator with more useful information for a debugging operation, as compared to the prior art.
(Application Example 1 of Embodiment 2)

In Application Example 1, the operator designates a memory area to be referenced upon execution of a given program description concerning an event, by use of the area designator 20. For example, the operator designates a given array variable corresponding to a given function described in the program, by use of the area designator 20.

The reason for this designation is as follows. Specifically, information (such as an address or a variable) concerning memory area, which is referenced by each function, is recorded in a log. For this reason, when the operator recognizes in advance of a bug within a description concerning a certain array variable(a variable corresponding to the parameter of the given function), the operator designates the array variable, by use of the area designator 20. The reason for such designation is to increase the possibility of extraction of log characteristic.
(Log Analysis Method)

A log analysis method using the above-described log analysis device of Application Example 1 can be carried out in the following processing. Firstly, for example, the operator obtains the log outputted from a debugger. For example, the debugger executes the program shown in FIG. 29, for example. As shown in FIG. 29, in the program, a function "main" and a function "g" reference a variable a1 (variable of class A type); the function "main" references a variable "a3" (variable of class Atype); and a function f and a function g reference a variable "a2 "(variable of class A type).

For example, FIG. 30 is a view showing a log outputted from the debugger (or a tracer). In the log, a program description concerning each event; information (addresses) indicating memory areas which are referenced upon execution of respective program descriptions; and data value stored in each memory area, are recorded according to an occurrence order of the events.

For example, in the log, information corresponding to event occurrence order "third" is "a1.height=10; a1:0x10010, a1.height:0x10010=10". In other words, in the log, information indicating that the program description "a1.height=10" was carried out upon occurrence of the third event, information indicating that the variable "a1" corresponding to top address (0x10010) of memory area was referenced upon occurrence of the third event; and information indicating that the data value "10" was stored in memory area(top address of memory area is 0x10010) corresponding to "a1:height".

The log analysis method of Application Example 1 can be carried out in the following processing. Description will be made below by use of FIG. 20. In step S200, the operator designates a given variable described in the program (the variable corresponding to a memory area to be referenced upon execution of a given program description), by use of the area designator 20.

For example, the operator who obtains the log shown in FIG. 30, designates variables of class A type "&a" (specifically, for example, "a1" and "a2") which are parameters of the function "g". To be more precise, as shown in FIG. 30, based on the content of the log ("g(a1); a1:0x10010" and "g(a2); a2:0x10020"), the operator judges that variables of class A type are variable "a1" and variable "a2".

In this case, for example, the operator designates information (a1:0x10010) indicating variable "a1" and address 0x10010" and information (a2:0x10020) indicating variable "a2" and address "0x10020", by use of the area designator 20. Here, the operator may designate only the variables ("a1" and "a2"), by use of the area designator 20. The contents of the log inputted by the operator are transmitted to the area designator 20. Then, the area designator 20 can obtain a correlation between each variable and each address of memory area, based on the contents of the inputted log. In this manner, the area designator 20 may designate an address corresponding to each variable designated by the operator.

Meanwhile, the operator can also designate a variable (g&(a)) instead of the variables (a1 and a2) by use of the area designator 20. In this way, the variable "a1" and variable "a2" may be automatically designated. Specifically, the contents of the inputted log are transmitted to the area designator 20. Then, the area designator 20 searches the contents of the log based on the designation of "g(&a)". Thereafter, the area designator 20 may designate information (a1:0x10010) indicating variable "a1" and address "0x10010" and information (a2:0x10020) indicating variable "a2" and address "0x10020"

The area designator 20 transmits all the designated variables to the log classifier 21. Meanwhile, the inputted log is transmitted to the log classifier 21.

In step S210, the log classifier 21 classifies each event for each designated variable, based on a reference to a variable designated by the area designator 20, being performed upon the occurrence of above each event. One example of concrete processing by the log classifier 21 will be described below.

For example, as shown in FIG. 30, program descriptions referencing to variable "a1" are "A a1", "a1.height", "a1.width", "g(a1)", and "area=a1.height*a1.width".

Meanwhile, program descriptions referencing to variable "a2" are "A a2", "a2.height", "a2.width", "g(a2)", and "area=a2.height*a2.width". Then, the log classifier 21 classifies each event (program description concerning each event) based on a reference to each variable("a1", "a2") being performed upon the occurrence of each event.

In step S220, the classified log generator 22 generates a classified log for each designated variable. As shown in FIG. 30, the classified log generator 22 generates the classified log 1, in which a plurality of events that are classified as events concerning the reference to the variable "a1", are recorded according to the occurrence order of each of the plurality of events. Similarly, the classified log generator 22 generates the classified log 2. FIG. 31 and FIG. 32 are views collectively showing one example of a plurality of classified logs generated by the classified log generator 22. Here, a mode of the classified log is not particularly limited. Thereafter, the classified log generator 22 transmits the plurality of classified logs to the log converter 13.

Then, the log analysis device performs the processing from step S230 and so forth, which are described in Embodiment 2. The log analysis device of this application example performs a log analysis without considering data value.

In the case of the classified logs shown in FIG. 32, in step S230, the event row generator 12 may generate an event row which is "A a, a.height, a.width, g, area=a.height*a.width". Then, the log converter 13 may convert the classified logs into the converted logs based on the event row. Thereafter, the event occurrence probability calculator 14, to which the converted logs are transmitted, calculates an event occurrence probability for each event. Meanwhile, the rarity calculator 15 calculates a rarity according to the method of the Embodiment 2. Moreover, the output unit 17 may output information concerning log characteristic.

In the case of FIG. 32, all the occurrence probabilities are 1. Accordingly, in step S260, a characteristic value of each converted log is calculated as 0.

For this reason, when the information concerning each of the converted logs is outputted from the output unit 17, the operator can judge that there is no log characteristic in the converted logs. Thereafter, as described in Embodiment 1, the log analysis device may perform the processing of step S70 and so forth, while considering data value of each parameter (a1 and a2).

The output unit 17 may output the contents of the respective classified logs after step S220. The operator can obtain information as to whether or not a log characteristic exists, based on the contents of the respective classified logs.

(Application Example 2 of Embodiment 2)

In Application Example 2, the operator designates a plurality of memory areas. In this case, area size of each of the memory areas is equal to each other. For example, the operator designates a plurality of variables (such as variables of integer type, variables of character type), by use of the area designator 20. This designation of the plurality of variables is equivalent to designation of the plurality of memory areas.

(Log Analysis Method)

A log analysis method using the above-described log analysis device of Application Example 2 can be carried out in the following processing. For example, if variables of class A type are designated, then the log analysis method can be carried out in the following processing.

Firstly, for example, the operator obtains the log outputted from a debugger. For example, the debugger executes the program shown in FIG. 29, for example. For example, FIG. 30 is a view showing a log outputted from the debugger.

The log analysis method of Application Example 2 can be carried out in the following processing. Description will be made below by use of FIG. 20. In step S200, the operator designates a plurality of variables described in the program, by use of the area designator 20.

For example, the operator who obtains the log shown in FIG. 30 designates variables of class A type (specifically, for example, "a1", "a2", "a3"). To be more precise, as shown in FIG. 30, based on the part of content of the log ("A a1;", "a1:0x10010", "A a2;", "a2:0x10020", "A a3;", and "a3:0x10030"), the operator judges that variables of class A type are variable "a1" variable "a2" and variable "a3". In this case, for example, the operator designates information (a1:0x10010) indicating variable "a1" and address "0x10010"; information (a2:0x10020) indicating variable" a2 and address 0x10020 and information (a3:0x10030) indicating variable "a3" and address 0x10030", by use of the area designator 20. Here, as similar to Application Example 1, the operator can designate only the plurality of variables, by use of the area designator 20.

Meanwhile, the operator can also designate a variable (class A) instead of the variables (a1, a2, a3), by use of the area designator 20. In this way, the variable "a1" variable "a2" and variable "a3" may be automatically designated. Specifically, the contents of the inputted log are transmitted to the area designator 20. Then, the area designator 20 searches the contents of the log based on the designation of "class A". Thereafter, the area designator 20 may designate the information (a1:0x10010), the information (a2:0x10020) and the information (a3:0x10030).

The area designator 20 transmits all the designated variables to the log classifier 21. Meanwhile, the inputted log is transmitted to the log classifier 21.

In step S210, the log classifier 21 classifies each event for each designated variable, based on a reference to a variable designated by the area designator 20, being performed upon the occurrence of above each event. One example of concrete processing by the log classifier 21 will be described below.

For example, as shown in FIG. 30, program descriptions referencing to variable "a1" are "A a1", "a1.height", "a1.width", "g(a1)", and "area=a1.height*a1.width". Meanwhile, program descriptions referencing to variable "a2" are "A a2", "a2.height", "a2.width", "g(a2)", and "area=a2.height*a2.width". Meanwhile, program descriptions referencing to variable "a3" are "A a3", "a3.height", and "area=a3.height*a3.width".

Then, the log classifier 21 classifies each event (program description concerning each event) based on a reference to each variable ("a1", "a2", "a3")being performed upon the occurrence of each event.

In step S220, the classified log generator 22 generates a classified log for each designated variable. As shown in FIG. 30, the classified log generator 22 generates the classified log 1, in which a plurality of events that are classified as events concerning the reference to the variable "a1", are recorded according to the occurrence order of each of the plurality of events. Similarly, the classified log generator 22 generates the classified log 2. FIG. 33 and FIG. 34 are views collectively showing one example of a plurality of classified logs generated by the classified log generator 22. Here, a mode of the classified log is not particularly limited. Thereafter, the classified log generator 22 transmits the plurality of classified logs to the log converter 13.

Then, the log analysis device performs the processing from step S230 and so forth, which are described in Embodiment 2. The log analysis device of this application example performs a log analysis without considering data value.

In the case of the classified logs shown in FIG. 34, in step S230, the event row generator 12 may generate an event row which is "A a, a.height, a.width, g, area=a.height*a.width". Then, the log converter 13 may convert the classified logs into the converted logs based on the event row. Thereafter, the event occurrence probability calculator 14, to which the converted logs are transmitted, calculates an event occurrence probability for each event. Meanwhile, the rarity calculator 15 calculates a rarity according to the method of the Embodiment 2. Moreover, the output unit 17 may output information concerning log characteristic.

In the case of FIG. 34, the rarity judging unit 16 judges that the a log characteristic is included in the converted logs. Meanwhile, the output unit 17 outputs information indicating that the characteristic value(degree) of converted log 3 is the largest value. In this way, the operator can judge that it is rare that an event concerning the program description (a.width) is not recorded in the converted log 3. Moreover, the operator can judge that it is rare that an event concerning the program description "g" is not recorded in the converted log 3.

Furthermore, by referencing to the contents of the converted log 3, the operator can judge that non-occurrence of the event concerning "g" is due to the following reason. The reason is because a call for the function "g" is not necessary for calculation of a function "area" (a function referencing the variable "a3") in the program. Accordingly, the operator can judge that non-existence of a record of the event (the event concerning "g") in the converted log 3 is not related to program bug.

On the other hand, by referencing to the contents of the converted log 3, the operator can judge that non-occurrence of the event concerning "a.width" is due to the following reason. The reason is because a value of "a3.width" is not described in the program, even though the value of "a3.width" is necessary for calculation of the function "area". Accordingly, the operator can judge that non-existence of a record of the event (the event concerning "a.width") in the converted log 3 is related to program bug.

The output unit 17 may output the contents of the respective classified logs after step S220. The operator can obtain information as to whether or not a log characteristic exists, based on the contents of the respective classified logs.

(Modified Example of Embodiment 2)

Incidentally, the rarity judging unit 16 can also judge as to whether or not log characteristic exists based on a given standard value. The operator can input the given standard value by use of the input unit 10. Then, the given standard value is transmitted to the rarity judging unit 16 and stored therein.

For example, in step S255, if there is a converted log corresponding to a rarity equal to or larger than 0.6 (the given standard value), then the rarity judging unit 16 can also judge that log characteristic is included in the plurality of converted logs.

Meanwhile, the log analysis device may also include a sorter (not shown). Specifically, if there are a plurality of rarities which exceed the given standard value, the sorter sorts the respective rarities calculated by the rarity calculator 15 in order of high rareness. Then, the sorter allows the output unit 17 to output the items of information concerning log corresponding to the respective rarities, in order of high rareness. As a consequence, according to the order, the operator can perform the debugging operation based on the items of information concerning log. In this way, the operator can perform a debugging operation efficiently.

Meanwhile, the operator can also input a given standard value (a given standard value concerning characteristic value) by use of the input unit 10. If there are a plurality of characteristic values which exceed the given standard value, the sorter sorts the respective characteristic values calculated by the characteristic value calculator, in order of high characteristic values. Then, the sorter allows the output unit 17 to output the items of information concerning logs corresponding to respective characteristic values, in order of high characteristic values.

(Embodiment of Log Analysis Program)

Figure 35:
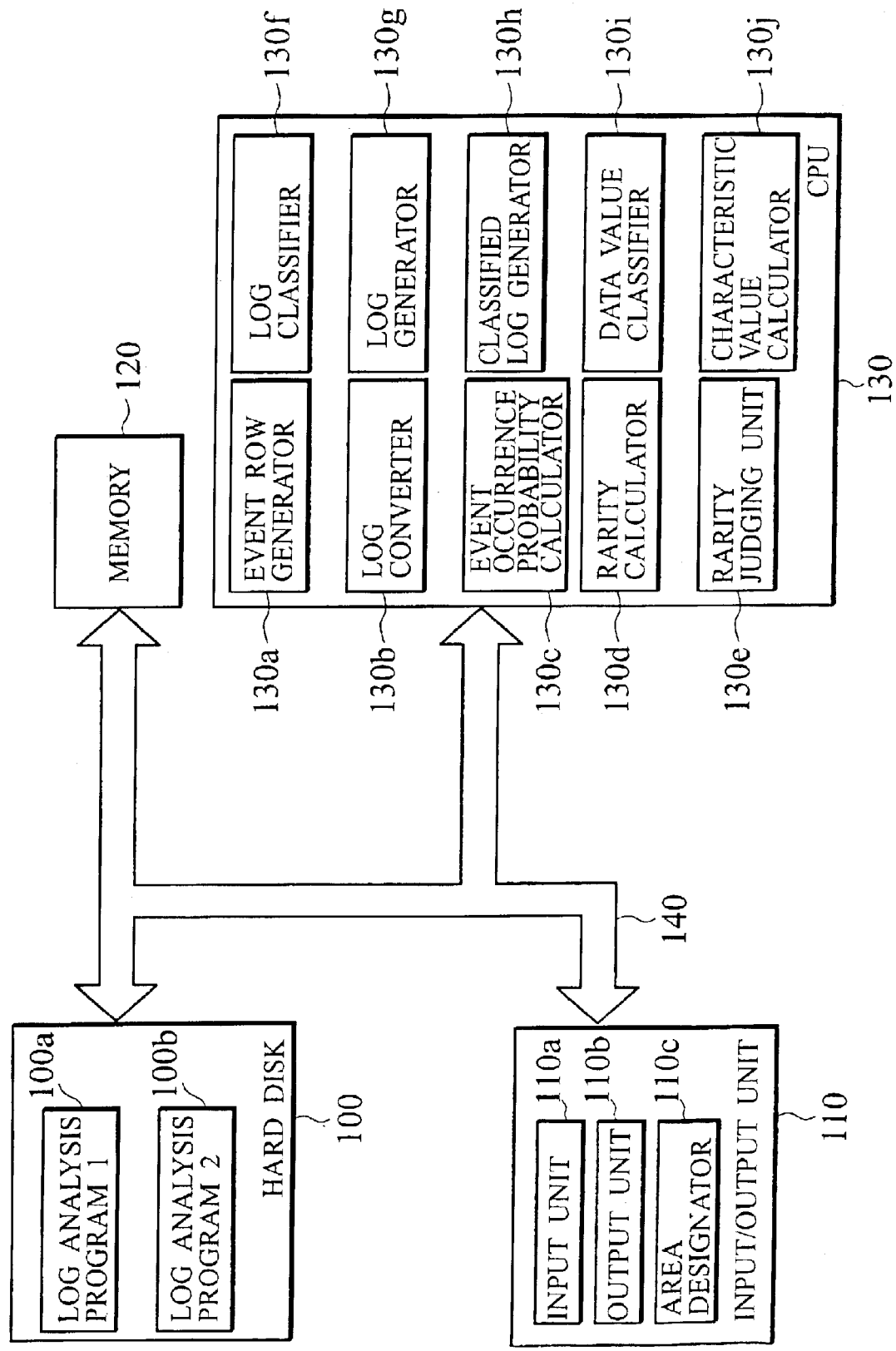
FIG. 35 is a view showing a configuration of a computer which stores a log analysis program of Embodiment 1, 2.

Incidentally, a computer can perform the processing of the above-described log analysis method by executing a log analysis program to be described later. FIG. 35 is a view showing a configuration of the computer. The computer includes a hard disk 100 configured to store (record) a log analysis program 1, a log analysis program 2 and various data; memory 120 configured to temporarily store data read from the hard disk 100 and results of operation by a CPU 130; the CPU 130 configured to perform various operation processing; an input/output unit 110; and a bus 140 configured to mutually connect the foregoing devices. An embodiment of the log analysis program 1 (100a) will be described first and an embodiment of the log analysis program 2 (100b) will be described thereafter.

(Log Analysis Program 1)

The input unit 110 with which the operator inputs various types of data. The output unit 110 outputs various types of data. The input/output unit 110 concludes, for example, a display device configured to display the contents of data, a keyboard (or a mouse) configured to input various data by key operation; and a printer device configured to print data.

The input/output unit 110 has a function of the input unit 110a and a function of the output unit 10b. The operator inputs a log outputted from a debugger, for example, by use of the input unit 110a. The output unit 110b outputs information concerning an event, as already explained in the embodiment 1.

The CPU 130 has functions of various processing units by executing the log analysis program 1 (100a) which is stored in the hard disk 100. To be more precise, the CPU 130 has a function of the log generator 130g which has the function of the log generator 11 in the embodiment 1. The CPU 130 generates a plurality of logs according to the method explained in the embodiment 1. Moreover, the CPU 130 has a function of the event row generator 130a which has the function of the event row generator 12 in the embodiment 1. The CPU 130 generates an event row according to the method explained in the embodiment 1.

Moreover, the CPU 130 has a function of the log converter 130b which has the function of the log converter 13 in the embodiment 1. The CPU 130 converts each log into each converted log according to the method explained in the embodiment 1. Furthermore, the CPU 130 has a function of the event occurrence probability calculator 130c which has the function of the event occurrence probability calculator 14 in the embodiment 1. The CPU 130 calculates event occurrence probability for each event occurrence order, according to the method explained in the embodiment 1. In addition, the CPU 130 has a function of the rarity calculator 130d which has the function of the rarity calculator 15 in the embodiment 1. The CPU calculates a rarity for each event occurrence order, according to the method explained in the embodiment 1. The CPU 130 has a function of the rarity judging unit 130e which has the function of the rarity judging unit 16 in the embodiment 1. The CPU 130 also has a function of the data value classifier 130i which has the function of the data value classifier 18 in the embodiment 1. The CPU 130 generates classification information according to the method explained in the embodiment 1, and gives the generated classification information to the respective events according to the method explained in the embodiment 1.

Moreover, the above-described event occurrence probability calculator 130c also has a function of calculating an event occurrence probability for each event occurrence order, based on the program descriptions concerning an event and data to be used upon the execution of the program descriptions. Furthermore, the above-described rarity calculator 130d also has a function of calculating a rarity, for each event occurrence order, based on the calculated event occurrence probability. The above-described rarity judging unit 130e also has a function of judging as to whether or not a log characteristic exists based on calculated rarity by the rarity calculator 130d.

The log analysis program 1 (100a), which is stored in hardware of the computer having the above-described configuration, is executed by the computer according to the following procedures.

Firstly, the operator inputs the log outputted from a debugger, by use of the input unit 110a. Then, the inputted information is transmitted to the CPU 130 via the bus 140 (the description "via the bus" will be hereinafter omitted). The CPU 130 reads the log analysis program 1 from the hard disk 100 and decrypts the log analysis program 1 so as to have each unit be able to execute a functions of each unit.

Next, the CPU 130 (the log generator 130g) generates a plurality of logs based on the inputted log. To be more precise, the inputted log is transmitted to the CPU 130. Based on the inputted log, the CPU 130 (the log generator 130g) generates the plurality of logs, each log being recorded a plurality of events according to each event occurrence order in each of the logs. Next, the CPU 130 (the event row generator 130a) generates an event row in which a plurality of events are recorded according to each event occurrence order, based on the pattern of the events recorded in each log generated by the log generator 130g.

Next, the CPU 130 (the log converter 130b) compares each event recorded in the generated event row with each event recorded in each log, and then converts each log into each converted log based on results of the comparison. Next, the CPU 130 (the event occurrence probability calculator 130c) calculates an event occurrence probability for each event occurrence order, based on program descriptions concerning each event. Next, the CPU 130 (the rarity calculator 130e) calculates a rarity, for each event occurrence order based on the event occurrence probability calculated by the event occurrence probability calculator 130c.

Next, the CPU 130 (the rarity judging unit 130e) judges as to whether or not a log characteristic is included in the converted logs based on the rarities calculated by the rarity calculator 130d. If it is judged that the log characteristic is included in the converted logs, information concerning the characteristic is transmitted to the output unit 110b. The output unit 110b outputs the information concerning the characteristic. If it is judged that the log characteristic is not included in the converted logs, the CPU 130 (the data value classifier 130i) generates the above-described classification information based on data to be used upon execution of program description concerning an event. Then, the data value classifier 130i gives the generated classification information to the respective events.

Next, the CPU 130 (the event occurrence probability calculator 130c) calculates an event occurrence probability for each event occurrence order, based on the program descriptions concerning event and classification information Next, the CPU 130 (the rarity calculator 130d) calculates a rarity, for each event occurrence order, based on the event occurrence probability calculated by the event occurrence probability calculator 130c. Next, the CPU 130 (the rarity judging unit 130e) judges as to whether or not the log characteristic exist based on each calculated rarity.

If the log characteristic does not exist, then information indicating that the log characteristic does not exist is transmitted to the output unit 110b. The output unit 10b outputs the information. Meanwhile, if the log characteristic exists, then the CPU 130 transmits the information concerning the log characteristic to the output unit lob. The output unit 110b outputs the transmitted information.

Here, the CPU 130 may also have a function of the judging unit in modified example 1 of the embodiment 1.

Moreover, after the operator inputs the log, the following processing is performed. When the CPU 130 (the judging unit) judges that all program descriptions are identical across the plurality of logs, then the CPU (the data value classifier 130i) may perform the processing of generating the classification information and so forth. Meanwhile, when the CPU 130 (the judging unit) judges that all program descriptions are not identical across the plurality of logs, CPU 130 may perform the steps from the processing performed by the log generator 130g to the judging processing performed by the rarity judging unit 130e (from step S15 to step S60 in FIG. 4).

Moreover, the CPU 130 may also have a function of the characteristic value calculator 130j which has the function of the characteristic value calculator in modified example 2 of the embodiment 1. The CPU 130 (the characteristic value calculator 130j) calculates a characteristic value of each log (or each converted log) based on the event occurrence probability. The CPU 130 (the characteristic value calculator 130j) transmits each characteristic value to the output unit 110b. The output unit 110b outputs each characteristic value.

According to the log analysis program of this embodiment, the computer has the function of the log analysis device of embodiment 1 (or modified example 1 of the embodiment 1, modified example 2 of the embodiment 1). For this reason, by use of the computer, the operation and effect of embodiment 1 (or modified example 1 of the embodiment 1, modified example 2 of the embodiment 1) is achieved.

(Log Analysis Program 2)

The input/output unit 110 has a function of the input unit 110a and a function of the output unit 110b. Here, the input/output unit 110 has a function of an area designator 110c which has the function of the area designator 20 in the embodiment 2.

The operator can designate an area of the memory 120 to be referenced upon execution of a program description concerning an event, by use of the input/output unit 110 (the area designator 110c). Moreover, the operator can designate a plurality of areas of the memory 120, by use of the input/output unit 110 (the area designator 110c), according to the method explained in the application example 2 of the embodiment 2. Hereinafter area of the memory 120 is referred to as memory area. In this case, an instruction to designate memory area is outputted to the output unit 110b. Based on the instruction, the operator designates a plurality of memory areas by use of the area designator 110c The output 110b outputs the information concerning an event, as already explained in the embodiment 2. Moreover, the output unit 10b outputs a characteristic value of each converted log calculated by the characteristic value calculator 130j.

The CPU 130 has a function of a log classifier 130f which has the function of the log classifier 21 in the embodiment 2. The CPU 130 has a function of a classified log generator 130h which has the function of the classified log generator 22 in the embodiment 2.

The CPU 130 has a function of an event row generator 130a which has the function of the event row generator 12 in the embodiment 2. The CPU 130 has a function of a log converter 130b which has the function of the log converter 13 in the embodiment 2. Furthermore, the CPU 130 has a function of an event occurrence probability calculator 130c which has the function of the event occurrence probability calculator 14 in the embodiment 2. The CPU 130 has a function of a rarity calculator 130d which has the function of the rarity calculator 15 in the embodiment 2. Moreover, the CPU 130 has a function of a characteristic value calculator 130j which has the function of the characteristic value calculator 19 in the embodiment 2.

The log analysis program 2 (100b), which is stored in the hard disk 100 of the computer having the above-described configuration, is executed by the computer according to the following procedures.

Firstly, the operator inputs the log outputted from a debugger, by use of the input unit 110a. Then, the inputted information is transmitted to the CPU 130. The CPU 130 reads the log analysis program 2 from the hard disk 100 and decrypts the log analysis program 2 so as to have each unit be able to execute a functions of each unit.

For example, the CPU 130 has the output unit 110b output an instruction to designate memory area. Based on the instruction, the operator inputs (designates) a given memory area by use of the input/output unit 110 (the area designator 110c).

The CPU 130 (the log classifier 130f) classifies each event for each designated array variable, based on a reference to an array variable designated by the area designator 20, being performed upon the occurrence of above each event. Next, the CPU 130 (the classified log generator 130h) generates a classified log for each designated array variable. In this case, the classified log is a log in which one or more events that are "classified as events concerning the reference to the memory area, are recorded according to the occurrence order of each of the events.

Next, the CPU 130 (log converter 130b) converts the respective classified logs into the converted logs. One example of concrete processing by the log converter 130b will be described below. The log converter 130b instructs the event row generator 130a to generate a given event row. The event row generator 130a generates the event row based on the pattern of events recorded in each classified log.

The log converter 130b performs the following processing for each event occurrence order. The log converter 130b compares each program description which is recorded in the event row, with each program description which is recorded in each classified log. Then, if "a program description corresponding to a certain event occurrence order recorded in the event row" coincides with a "program description corresponding to the event occurrence order recorded in each log, the log converter 130b records, in each converted log, the program description in association with the event occurrence order. If a program description corresponding to a certain event occurrence order is not recorded in each log, the log converter 13 records, in each converted log, information "indicating that a program description is not recorded" in association with the event occurrence order.

Next the CPU 130 (the event occurrence probability calculator 130c) calculates an event occurrence probability, for each event occurrence order, based on the program description concerning each event recorded in each of the converted logs.

Next the CPU 130 (the rarity calculator 130*d*) calculates a rarity, for each event occurrence order, based on the event occurrence probability calculated by the event occurrence probability calculator 130*c*. Next the CPU 130 (the rarity judging unit 130*e*) judges as to whether or not log characteristic is included in the plurality of converted logs, based on the each calculated rarity.

If it is judged that the log characteristic is included in the plurality of converted logs, the CPU 130 transmits the information concerning the log characteristic to output unit 110*b*. The output unit 110*b* outputs the information. If it is judged that the log characteristic is not included in the plurality of converted logs, the CPU 130 (the characteristic value calculator 130*j*) calculates a characteristic value of each log, based on each calculated rarity. Each characteristic value is transmitted to the output unit 110*b*. The output unit 10*b* outputs each characteristic value.

Here, the CPU 130 (the characteristic value calculator 130*j*) can also calculate a characteristic value of each log, based on each calculated event occurrence probability.

According to the log analysis program of this embodiment, the computer has the function of the log analysis device of embodiment 2 (or Application example 1, 2 of the embodiment 2, modified example of the embodiment 2). For this reason, by use of the computer, the operation and effect of embodiment 2 (or Application example 1, 2 of the embodiment 2, modified example of the embodiment 2)is achieved.

Although the log analysis program 1 (110*a*) and the log analysis program 2 (100*b*) are constituted separately in the foregoing description, the modes of the log analysis programs are not limited to such the constitution. For example, the contents of the log analysis program 1 and the contents of the log analysis program 2 may be recorded in one program.

Figure 36:
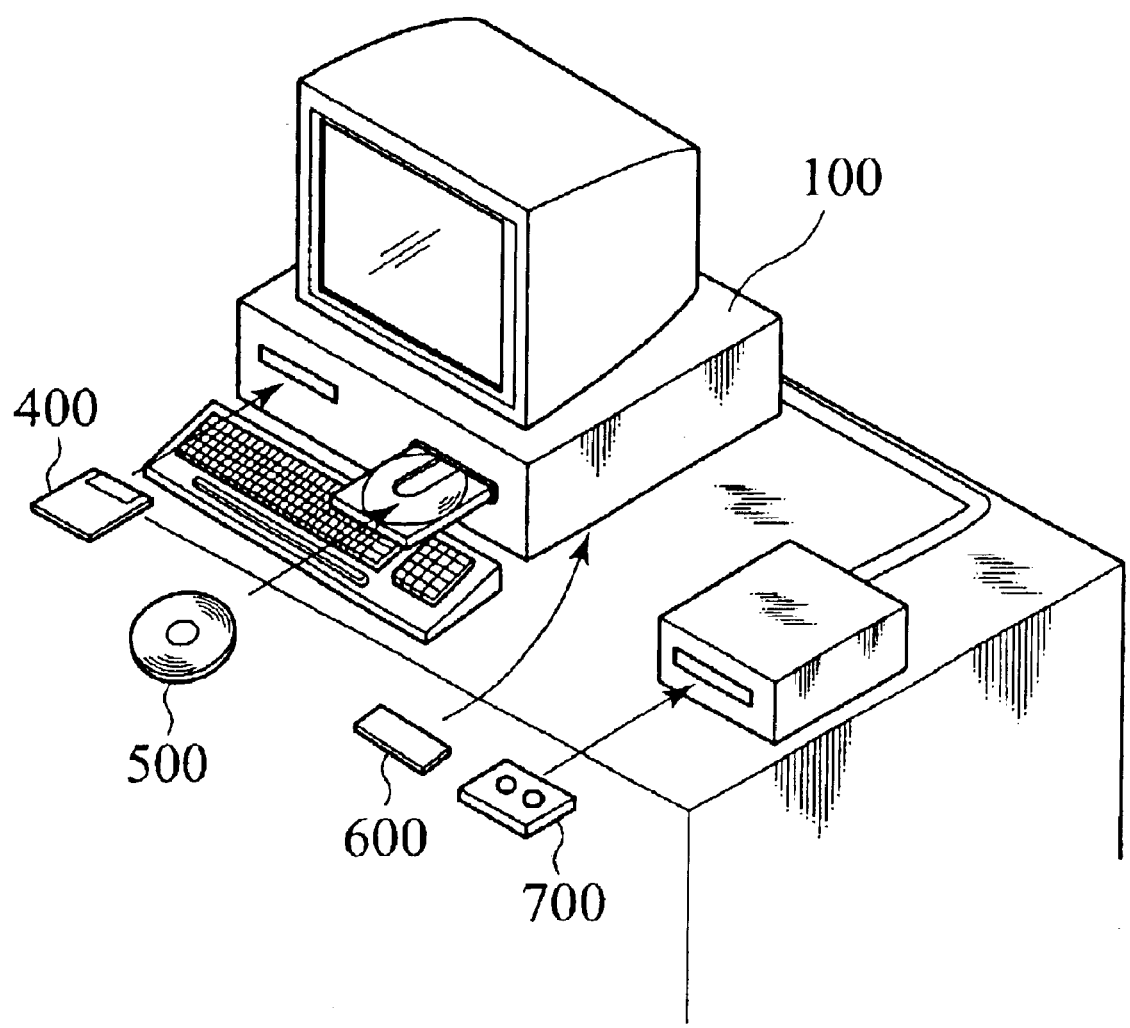
FIG. 36 is a view showing recording media storing the log analysis program of Embodiment 1, 2.

Moreover, the log analysis program 1 and/or the log analysis program 2 may be recorded in a computer-readable recording medium. As shown in FIG. 36, for example, a recording medium may be a hard disk 100, a flexible disk 400, a compact disk 500, an IC chip 600, or a cassette tape 700. By use of the computer readable recording medium storing the log analysis program 1 and/or the log analysis program 2, the operator can easily keep, carry or sell the log analysis program 1 and/or the log analysis program2, for example.

Various modifications will become possible for those skilled in the art after receiving the teachings of the present disclosure without departing from the scope thereof.

What is claimed is:

1. A log analysis method comprising:
   executing a program a plurality of times;
   generating a plurality of logs, each log being recorded a plurality of events occurring upon the execution of the program according to an occurrence order of each of the events in each of the logs;
   performing a first calculation to calculate an event occurrence probability, for the occurrence order of each event, based on at least one from the program description concerning each event recorded in the logs and the data to be used upon the execution of the program description; and
   outputting information concerning an event which corresponds to a characteristic included in the logs, based on the event occurrence probability.

2. The log analysis method of claim 1 further comprising:
   calculating rarity, indicating a level of an occurrence frequency of each event, for the occurrence order of each event, based on each calculated event occurrence probability; and
   outputting information concerning an event which corresponds to a characteristic included in the logs, based on the calculated rarity.

3. The log analysis method of claim 2 further comprising:
   generating an event row in which a plurality of events are recorded according to the occurrence order of each of the plurality of events, based on events recorded in each of the plurality of logs;
   comparing each event recorded in the event row with each event recorded in each of the logs respectively;
   converting each of the logs into converted log respectively, based on result of the comparison;
   calculating an event occurrence probability for the occurrence order of each event, based on each program description concerning each event recorded in each of the converted logs;
   calculating rarity, indicating a level of an occurrence frequency of each event, for the occurrence order of each event, based on each calculated event occurrence probability; and
   performing a first judgment to judge as to whether or not a characteristic is included in the converted logs, based on each calculated rarity;
   wherein the first calculation is performed based on a judgment result of the first judgment.

4. The log analysis method of claim 3 further comprising:
   calculating a characteristic value of a converted log indicating the degree, from among a plurality of converted logs, the converted log may contain a distinguishing characteristic, for each converted log; and
   outputting the characteristic value of each converted log.

5. The log analysis method of claim 1 further comprising:
   generating an event row in which a plurality of events are recorded according to the occurrence order of each of the plurality of events, based on events recorded in each of the plurality of logs;
   comparing each event recorded in the event row with each event recorded in each of the logs respectively;
   converting each of the logs into converted log respectively, based on result of the comparison;
   calculating an event occurrence probability for the occurrence order of each event, based on each program description concerning each event recorded in each of the converted logs;
   calculating rarity, indicating a level of an occurrence frequency of each event, for the occurrence order of each event, based on each calculated event occurrence probability; and
   performing a first judgment to judge as to whether or not a characteristic is included in the converted logs, based on each calculated rarity;
   wherein the first calculation is performed based on a judgment result of the first judgment.

6. The log analysis method of claim 5 further comprising:
   calculating a characteristic value of a converted log indicating the degree, from among a plurality of converted logs, the converted log may contain a distinguishing characteristic, for each converted log; and
   outputting the characteristic value of each converted log.

7. A log analysis method configured to analyze a log in which a series of events occurring upon execution of a program are recorded according to an occurrence order of each of the events, the log analysis method comprising:

classifying each event based on a reference to a memory area being performed upon execution of a program description corresponding to the each event;

generating a classified log, in each of which one or more events classified as event concerning the reference to the memory area, are recorded according to the occurrence order of each event, for each memory area;

generating an event row in which a plurality of events are recorded according to the occurrence order of each of the plurality of events, based on events recorded in each of the plurality of classified logs;

comparing each event recorded in the event row with each event recorded in each of the classified logs respectively;

converting each of the classified logs into converted log respectively, based on result of the comparison;

calculating an event occurrence probability for the occurrence order of each event, based on each program description concerning each event recorded in each of the converted logs;

calculating rarity, indicating a level of an occurrence frequency of each event, for the occurrence order of each event, based on each calculated event occurrence probability; and outputting information concerning the event which corresponds to a characteristic included in the converted logs, based on each calculated rarity.

8. The log analysis method of claim 7 further comprising:

calculating a characteristic value of a converted log indicating the degree, from the plurality of converted logs, the converted log may contain a distinguishing characteristic, for each converted log; and outputting the characteristic value of each converted log.

9. A computer-readable recording medium storing a log analysis program configured to analyze a log by controlling a computer, the log analysis program causing a computer to execute a process comprising:

executing a program a plurality of times;

generating a plurality of logs, each log being recorded a plurality of events occurring upon the execution of the program according to an occurrence order of each of the events in each of the logs;

performing a first calculation to calculate an event occurrence probability, for the occurrence order of each event, based on at least one from the program description concerning each event recorded in the logs and the data to be used upon the execution of the program description; and outputting information concerning an event which corresponds to a characteristic included in the logs, based on the event occurrence probability.

10. The computer-readable recording medium of claim 9 storing the log analysis program, the log analysis program further causing the computer to execute a process comprising:

calculating rarity, indicating a level of an occurrence frequency of each event, for the occurrence order of each event, based on each calculated event occurrence probability; and outputting information concerning an event which corresponds to a characteristic included in the logs, based on the calculated rarity.

11. The computer-readable recording medium of claim 10 storing the log analysis program, the log analysis program further causing the computer to execute a process comprising:

generating an event row in which a plurality of events are recorded according to the occurrence order of each of the plurality of events, based on events recorded in each of the plurality of logs;

comparing each event recorded in the event row with each event recorded in each of the logs respectively;

converting each of the logs into converted log respectively, based on result of the comparison;

calculating an event occurrence probability for the occurrence order of each event, based on each program description concerning each event recorded in each of the converted logs;

calculating rarity, indicating a level of an occurrence frequency of each event, for the occurrence order of each event, based on each calculated event occurrence probability; and performing a first judgment to judge as to whether or not a characteristic is included in the converted logs, based on each calculated rarity;

wherein the first calculation is performed based on a judgment result of the first judgment.

12. The computer-readable recording medium of claim 11 storing the log analysis program, the log analysis program further causing the computer to execute a process comprising:

calculating a characteristic value of a converted log indicating the degree, from among a plurality of converted logs, the converted log may contain a distinguishing characteristic, for each converted log; and outputting the characteristic value of each converted log.

13. The computer-readable recording medium of claim 9 storing the log analysis program, the log analysis program further causing the computer to execute a process comprising:

generating an event row in which a plurality of events are recorded according to the occurrence order of each of the plurality of events, based on events recorded in each of the plurality of logs;

comparing each event recorded in the event row with each event recorded in each of the logs respectively;

converting each of the logs into converted log respectively, based on result of the comparison;

calculating an event occurrence probability for the occurrence order of each event, based on each program description concerning each event recorded in each of the converted logs;

calculating rarity, indicating a level of an occurrence frequency of each event, for the occurrence order of each event, based on each calculated event occurrence probability; and performing a first judgment to judge as to whether or not a characteristic is included in the converted logs, based on each calculated rarity;

wherein the first calculation is performed based on a judgment result of the first judgment.

14. The computer-readable recording medium of claim 13 storing the log analysis program, the log analysis program further causing the computer to execute a process comprising:

calculating a characteristic value of a converted log indicating the degree, from among a plurality of converted logs, the converted log may contain a distinguishing characteristic, for each converted log; and outputting the characteristic value of each converted log.

15. A computer-readable recording medium storing a log analysis program configured to analyze a log by controlling a computer, the log in which a series of events occurring upon execution of a program are recorded according to an occurrence order of each of the events, the log analysis program causing a computer to execute a process comprising:

classifying each event based on a reference to a memory area being performed upon execution of a program description corresponding to the each event;

generating a classified log, in each of which one or more events classified as event concerning the reference to the memory area, are recorded according to the occurrence order of each event, for each memory area;

generating an event row in which a plurality of events are recorded according to the occurrence order of each of the plurality of events, based on events recorded in each of the plurality of classified logs;

comparing each event recorded in the event row with each event recorded in each of the classified logs respectively;

converting each of the classified logs into converted log respectively, based on result of the comparison;

calculating an event occurrence probability for the occurrence order of each event, based on each program description concerning each event recorded in each of the converted logs;

calculating rarity, indicating a level of an occurrence frequency of each event, for the occurrence order of each event, based on each calculated event occurrence probability; and outputting information concerning the event which corresponds to a characteristic included in the converted logs, based on each calculated rarity.

16. The computer-readable recording medium of claim 15 storing the log analysis program, the log analysis program further causing the computer to execute a process comprising:

calculating a characteristic value of a converted log indicating the degree, from the a plurality of converted logs, the converted log may contain a distinguishing characteristic, for each converted log; and outputting the characteristic value of each converted log.

* * * * *